United States Patent
Watanabe et al.

(10) Patent No.: US 7,277,859 B2
(45) Date of Patent: Oct. 2, 2007

(54) DIGEST GENERATION METHOD AND APPARATUS FOR IMAGE AND SOUND CONTENT

(75) Inventors: Tomoki Watanabe, Yokohama (JP); Shinya Uegaki, Yokohama (JP); Katsumi Kishida, Yokosuka (JP); Koichiro Yamamoto, Yokosuka (JP); Takashi Hosobuchi, Yokosuka (JP); Wataru Inoue, Yokosuka (JP); Hisashi Matsukawa, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 964 days.

(21) Appl. No.: 10/323,943

(22) Filed: Dec. 20, 2002

(65) Prior Publication Data
US 2003/0120495 A1 Jun. 26, 2003

(30) Foreign Application Priority Data
Dec. 21, 2001 (JP) ............................. 2001-389944
Oct. 24, 2002 (JP) ............................. 2002-310057

(51) Int. Cl.
*H04N 7/173* (2006.01)
(52) U.S. Cl. .................... 704/278; 725/44; 725/46; 725/50
(58) Field of Classification Search ............... 704/270, 704/278, 503, 504; 725/9, 46, 61, 44, 45, 725/50
See application file for complete search history.

(56) References Cited

U.S. PATENT DOCUMENTS

| | | | |
|---|---|---|---|
| 5,798,785 A * | 8/1998 | Hendricks et al. ............ 725/46 |
| 5,859,899 A | 1/1999 | Sakai et al. |
| 6,047,052 A | 4/2000 | Sakai et al. |
| 6,160,950 A * | 12/2000 | Shimazaki et al. ........... 386/46 |
| 6,581,207 B1 | 6/2003 | Sumita et al. |
| 6,757,482 B1 * | 6/2004 | Ochiai et al. ................. 386/83 |
| 7,047,550 B1 * | 5/2006 | Yasukawa et al. ............ 725/44 |
| 7,055,165 B2 * | 5/2006 | Connelly ....................... 725/9 |
| 7,082,255 B1 * | 7/2006 | Jun .............................. 386/83 |

(Continued)

FOREIGN PATENT DOCUMENTS

JP 8-116514 5/1996

(Continued)

OTHER PUBLICATIONS

M. Hatori, pp. 678-679, "Computer/Communication/Broadcasting Standard Dictionary", Apr. 21, 1998.

*Primary Examiner*—Martin Lerner
(74) *Attorney, Agent, or Firm*—Oblon, Spivak, McClelland, Maier & Neustadt, P.C.

(57) ABSTRACT

A method for a digest generating apparatus to generate a digest of image content or sound content is provided. The digest generating apparatus obtains an audience rating or an audience count of image content or sound content at established time intervals, and extracts images from the image content or extracts sounds from the sound content. The extracted images or the extracted sounds correspond to a time when the audience rating or the audience count exceeds a threshold. Then, the digest generating apparatus generates a digest by using the extracted images or the extracted sounds. The audience rating or the audience count can be obtained by using audience data corresponding to an audience group having a specific user profile.

20 Claims, 25 Drawing Sheets

U.S. PATENT DOCUMENTS

| | | | |
|---|---|---|---|
| 7,127,736 B2 * | 10/2006 | Kondo et al. | 725/93 |
| 2002/0078469 A1 * | 6/2002 | Kano | 725/139 |
| 2002/0083459 A1 | 6/2002 | Kondo et al. | |
| 2002/0152460 A1 * | 10/2002 | Soloff | 725/14 |
| 2002/0157095 A1 * | 10/2002 | Masumitsu et al. | 725/46 |
| 2003/0135539 A1 * | 7/2003 | Kondo et al. | 709/201 |
| 2003/0135852 A1 | 7/2003 | Kamemoto | |
| 2003/0187919 A1 * | 10/2003 | Nakamura et al. | 709/203 |
| 2006/0104609 A1 * | 5/2006 | Ohmori et al. | 386/68 |
| 2006/0242673 A1 * | 10/2006 | Kondo et al. | 725/89 |
| 2007/0061853 A1 * | 3/2007 | Kondo et al. | 725/89 |

FOREIGN PATENT DOCUMENTS

| | | |
|---|---|---|
| JP | 10-023362 | 1/1998 |
| JP | 10-155026 | 6/1998 |
| JP | 11-220667 | 8/1999 |
| JP | 11-238071 | 8/1999 |
| JP | 11-331761 | 11/1999 |
| JP | 2000-23112 | 1/2000 |
| JP | 2001-103404 | 4/2001 |
| JP | 2001-157169 | 6/2001 |
| JP | 2002-232823 | 8/2002 |
| JP | 2002-245069 | 8/2002 |

* cited by examiner

FIG.3

| AUDIENCE ID | CHANNEL NUMBER | VIEWING TIME |
|---|---|---|

| TIME AND DAY | START TIME | END TIME | CHANNEL |
|---|---|---|---|
| NOVEMBER 22, 2001 | 12:00 | 18:00 | 4ch |
| NOVEMBER 22, 2001 | 18:00 | 21:00 | 8ch |
| ⋮ | ⋮ | ⋮ | ⋮ |

FIG.5A

| TIME PERIOD \ PROGRAM ID | M01234 | D56789 | S24680 |
|---|---|---|---|
| ⋮ | ⋮ | ⋮ | ⋮ |
| 2001/11/2 18:59:30<br>2001/11/2 19:00:00 | 13.7% | (20.5%) | 15.6% |
| 2001/11/2 19:00:00<br>2001/11/2 19:00:30 | 19.8% | 16.3% | 9.6% |
| 2001/11/2 19:00:30<br>2001/11/2 19:01:00 | (23.5%) | 14.1% | 5.6% |
| ⋮ | ⋮ | ⋮ | ⋮ |

FIG.5B

THRESHOLD = 20%

| PROGRAM | TIME PERIOD |
|---|---|
| D56789 | 2001/11/2 18:59:30<br>2001/11/2 19:00:00 |
| M01234 | 2001/11/2 19:00:30<br>2001/11/2 19:01:00 |
| ⋮ | ⋮ |

FIG.8

| PROGRAM NAME | PROGRAM ID | PROGRAM CONTENT URL | TIME LENGTH | CLIMAX IMAGE URL |
|---|---|---|---|---|
| MUSIC 1 | M01234 | http://www.digest.com/M01234 | 2:12 | http://climax.com/M01234 |
| DRAMA 2 | D56789 | http://www.digest.com/D56789 | 0:56 | http://climax.com/D56789 |
| ... | ... | ... | ... | ... |

| VIEWING TIME (EACH 30S) | AUDIENCE ID | CHANNEL INFORMATION |
|---|---|---|
| ⋮ | ⋮ | ⋮ |
| 2001/11/2 18:59:30 | A0001 | 001 |
| 2001/11/2 18:59:30 | B0002 | 002 |
| 2001/11/2 18:59:30 | C0003 | 002 |
| ⋮ | ⋮ | ⋮ |
| 2001/11/2 19:00:00 | A0001 | 001 |
| 2001/11/2 19:00:00 | B0002 | 002 |
| 2001/11/2 19:00:00 | C0003 | 001 |
| ⋮ | ⋮ | ⋮ |
| 2001/11/2 19:00:30 | A0001 | 001 |
| 2001/11/2 19:00:30 | B0002 | 001 |
| 2001/11/2 19:00:30 | C0003 | 001 |
| ⋮ | ⋮ | ⋮ |

FIG.18

| AUDIENCE ID | GENDER | AGE | AREA |
|---|---|---|---|
| 100 | MALE | 24 | ABC |
| 101 | FEMALE | 32 | XYZ |
| 102 | MALE | 37 | LMN |
| ⋮ | ⋮ | ⋮ | ⋮ |

DIGEST GENERATION METHOD AND APPARATUS FOR IMAGE AND SOUND CONTENT

BACKGROUND OF THE INVENTION

1. Field of the Invention

The present invention relates to a technology for automatically generating digests of image content or sound content.

2. Description of the Related Art

Conventionally, a person who makes a digest (to be referred to as a digest maker) manually makes a digest by cutting and/or connecting scenes selected by an image editor or cutting and/or connecting scenes automatically extracted by detecting breaks in the image content by using a computer. For automatically generating a digest, there is a method of extracting distinctive parts in which sound or image is changing in the image content, and, there is a method of extracting parts corresponding to predetermined time intervals in the image content irrespective of the substance of the image content.

When preparing the digest manually, it is very difficult to obtain a digest that is valued highly by audiences. Thus, it can be considered that an audience evaluates the digest first, and the result of the evaluation is reflected to the digest. However, it takes very long time to make a digest from a plurality of programs by such a conventional process.

If the digest is generated automatically, labor and time can be saved. However, a part that looks attractive for audiences is not necessarily included in the digest. Thus, no one knows whether the digest will be highly evaluated by the audiences. The digest may be used for advertisement, for example. However, according to the above-mentioned conventional technology, an effective advertisement cannot be realized.

In addition, a part that looks attractive in the image content may be viewed differently according to a user profile such as generation, place of residence, gender and the like. However, the differences cannot be reflected in the digest according to the conventional technology.

SUMMARY OF THE INVENTION

An object of the present invention is to provide a method and an apparatus for automatically generating an effective digest by using audience ratings or audience counts.

The object can be achieved by a method for a digest generating apparatus to generate a digest of image content or sound content, the method including: an obtaining step of obtaining an audience rating or an audience count of image content or sound content at established time intervals; an extraction step of extracting images from the image content or extracting sounds from the sound content, wherein the extracted images or the extracted sounds correspond to a time when the audience rating or the audience count exceeds a threshold; and a generation step of generating a digest by using the extracted images or the extracted sounds.

According to this method, a digest can be generated by using audience ratings or audience counts, so that an effective digest reflecting audiences' interests is obtained.

The obtaining step may includes the steps of: obtaining audience data indicating that an audience watched or listened to the image content or the sound content; and obtaining the audience rating or the audience count by using the audience data for a plurality of audiences. The audience rating or the audience count can be obtained in the digest generating apparatus, or can be obtained from another apparatus.

In the method, when the image content or the sound content includes a plurality of programs, the method comprising the steps of, instead of the extraction step and the generation step: obtaining short images corresponding to at least a program, among the plurality of programs, whose audience rating or audience count exceeds a threshold; and generating a digest by using the short images.

Accordingly, climax scenes and the like having high audience ratings or high audience counts can be extracted, and the digest can be used as an advertisement of stored image content.

The method may include the steps of: receiving designation of a specific genre; and generating the digest of image content or sound content that belongs to the specific genre. According to this method, for example, a digest only for "baseball" can be automatically generated.

In the method, the audience rating or the audience count may be obtained by using audience data corresponding to an audience group having a specific user profile. The user profile can be area, gender, age and the like.

According to this method, a digest can be generated for a target to which the digest is to be sent as an advertisement, so that an effective digest can be generated.

The method may include the steps of: increasing or decreasing, by a predetermined amount, the audience rating or the audience count that corresponds to predetermined images or sounds in the image content or the sound content; and generating the digest by using increased or decreased audience ratings, or by using increased or decreased audience counts.

According to the method, images to be included preferentially in a digest can be included, and images that should be excluded can be excluded. Thus, an effective digest can be generated. The predetermined images or sounds can be changed over time.

In addition, the method may include the step of: excluding predetermined images or sounds in the image content or the sound content from candidate images or sounds to be included in the digest, or, including predetermined images or sounds in the digest.

By excluding predetermined images or sounds, the digest image generating apparatus can exclude, from a digest, specific images in which, if the specific images are to be viewed by audiences before original image content is distributed or at an initial stage of distribution, the original image content would not affect the audiences strongly. As a result, distributing a digest that has a negative effect as an advertisement can be avoided.

In addition, by including predetermined images or sounds properly, a specific scene can be included in the digest preferentially according to intentions of a sponsor or an agency that an actor belongs to, in which, for example, the specific scene is a scene on which an actor who the sponsor wants to include in the digest appears, or the specific scene is a scene that is specifically made for a digest. The predetermined images or sounds can be changed over time.

By changing images or sounds to be excluded, interesting scenes or scenes effective for advertisement can be newly included gradually in the digest over time, so that an effective digest can be sent to audiences which were not interested in the initial digest. By changing images or sounds to be included preferentially, even if an initial digest is generated only on the basis of a sponsor's intentions, the digest can be regenerated such that the digest reflects audiences' interests. In addition, images that cannot be included in a digest can be gradually included in a later digest, so that the digest can be changed effectively.

The method may further include the steps of: obtaining differences between first audience ratings or first audience counts obtained at a first time and second audience ratings or second audience counts obtained at a second time; and adding specific images or sounds in the image content or the sound content to the digest according to the differences, or deleting the specific images or sounds from the digest according to the differences According to this method, a digest can be generated in consideration of audiences' interests that may change over time.

In addition, the method may further include the steps of: obtaining differences between first audience ratings or first audience counts, and, second audience ratings or second audience counts, wherein the first audience ratings or the first audience counts correspond to audiences who have watched or listened to the digest generated before, and the second audience ratings or the second audience counts correspond to audiences who have not watched or listened to the digest generated before; and adding specific images or sounds in the image content or the sound content to the digest according to the differences, or deleting the specific images or sounds from the digest according to the differences.

According to this method, information that indicates whether an audience has seen the original digest is used. Accordingly, when interests of audiences are shifted over time, new audience ratings or counts can be generated according to interests of audiences who have seen the original digest, so that the shift from initial interests can be reflected and a new effective digest can be generated.

In addition, according to the present invention, a digest generating apparatus applicable to executes the above-mentioned method. And, a computer program and a computer readable medium storing the computer program that causes a computer to execute the method can be provided.

As mentioned above, according to the present invention, by using the user profile such as area, age, gender and the like of audiences, a digest specific for an advertisement sending target can be generated. In addition, specific images can be included in or excluded from the digest, so that a request from a sponsor of image content and the like can be addressed with flexibility, in which the specific images that the sponsor does not want to include in the digest are excluded or images that the sponsor wants to include in the digest are included.

BRIEF DESCRIPTION OF THE DRAWINGS

Other objects, features and advantages of the present invention will become more apparent from the following detailed description when read in conjunction with the accompanying drawings, in which:

FIG. 3 shows an example of audience data according to the first embodiment of the present invention;

FIG. 4 shows an example of the digest target program list according to the first embodiment of the present invention;

FIG. 5A shows examples of audience ratings every 30 seconds for each digest target program;

FIG. 5B shows image parts extracted as the digest from the table shown in FIG. 5A;

FIG. 8 shows an example of a digest target program list according to the second embodiment of the present invention;

FIG. 9 shows an example of audience data according to the second embodiment of the present invention;

FIG. 18 shows an example of a user profile stored in an audience data storing part 122 according to the fourth embodiment of the present invention;

DETAILED DESCRIPTION OF THE PREFERRED EMBODIMENTS

In the following, embodiments of the present invention will be described in detail with reference to figures. The following embodiments will be described taking "image content" as an example. Although the "image content" may include only images, the "image content" includes sound in general. Even when no image is included and only sound exists in the "image content", that is, even when "image content" is replaced by "sound content", the digest can be generated in the same way as the following embodiments.

The following embodiments include the case that "image content" is actually "sound content".

According to the system of the embodiments of the present invention, audience ratings or audience counts of a program that is being broadcast or of a program played back from a recording medium are calculated at predetermined time intervals, and images for which the audience rating or the audience count exceeds a predetermined threshold are extracted, so that image interest by the audiences is determined. On the basis of the result, the images are automatically extracted and a digest is automatically generated. In this specification, the word "audience rating" may include the meaning "number of audiences".

Figure 1A:
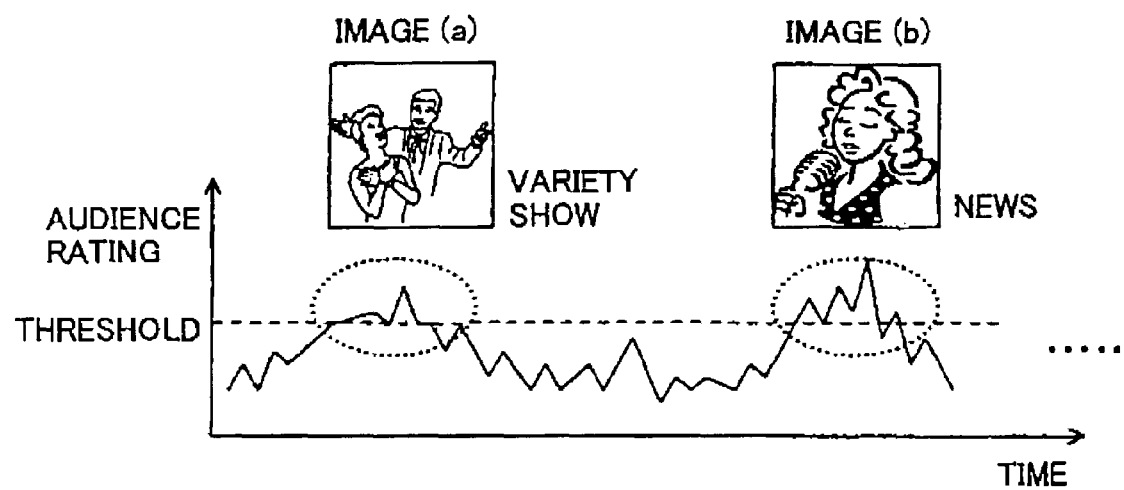
FIGS. 1A and 1B are figures for explaining concepts of the embodiments of the present invention.
Figure 1B:

FIGS. 1A and 1B are figures for explaining concepts of the embodiments of the present invention. FIG. 1A is an example of a graph showing a relationship between time and audience ratings on ○ month ○ day. According to the present invention, a threshold of the audience rating is predetermined, and images corresponding to times when the audience rating exceeds the threshold are picked up, so that the digest is generated. In the example of FIG. 1A, images (a) of a variety program are picked up first since the audience ratings of the time of the images exceed the threshold. Images (b) of a news program are picked up next. Then, every time when the audience rating exceeds the threshold, the image of the time is picked up.

The picked up images that have high audience ratings are edited to generate a digest. FIG. 1B is an example of a digest on ○ month ○ day.

The digest of FIG. 1B is generated on the basis of audience ratings of FIG. 1A. This example shows that the digest is generated by connecting the images (a), images (b) and the like in the time order in which the rating of the image exceeds the threshold.

The audience rating indicates interest degree of the audiences. It can be said that an image of a high audience rating indicates high interest by the audiences in the program. In addition, a program having higher audience ratings than the other programs is highly interesting to the audiences, and it can be considered that a climax scene and a promotion image of the program attract the audiences.

According to the present invention, by detecting images corresponding to high audience ratings automatically and by extracting the images, a digest that grabs audiences' attention more effectively can be generated. Although the graph shown in FIG. 1A uses audience ratings for the vertical axis, the number of audiences (that will be called audience count in this specification) can be used as the vertical axis. When using the audience count, the graph becomes a histogram indicating an audience count for each time unit.

In the following, each of the embodiments will be described with reference to figures.

First Embodiment

Although a method for generating a digest from a program that is being broadcast in real time will be described in the first embodiment, when the program is played back from a recording medium, the digest can be generated in the same way.

Figure 2:
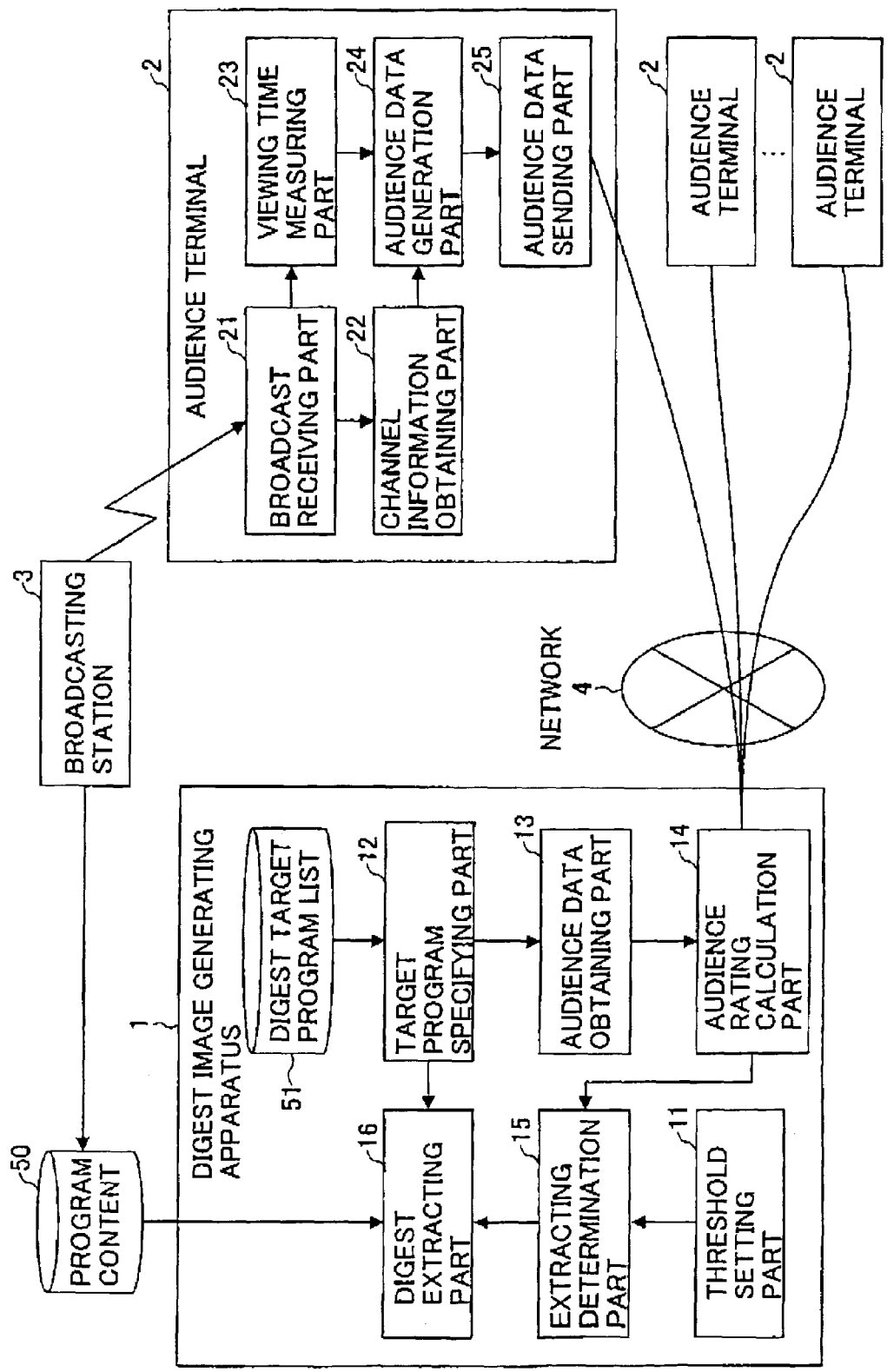
FIG. 2 is a block diagram of a system of a first embodiment of the present invention.

FIG. 2 is a block diagram of the system of the first embodiment. This system includes a digest image generating apparatus 1 for generating a digest, a plurality of audience terminals 2 that are broadcast receive terminals of each audience, a broadcasting station 3 for providing program content by broadcasting, and a network 4 such as the Internet.

The audience terminal 2 includes a broadcast receiving part 21 for receiving a broadcast program from the broadcasting station 3, a channel information obtaining part 22 for obtaining channel information in which the channel is being watched or listened to, a viewing time measuring part 23 for measuring the time at which the audience is watching or listening to the program content, and an audience data generation part 24 for generating audience data including at least channel information and viewing time, and an audience data sending part 25 for sending audience data periodically to the digest image generating apparatus 1 via the network 4.

FIG. 3 shows an example of the audience data generated by the audience data generation part 24. The digest image generating apparatus 1 receives the audience data, so as to grasp that a program corresponding to the channel number is watched or listened to at a viewing time (a time interval including the viewing time) indicated in the audience data in the terminal that sends the audience data.

In the audience terminal 2, if the audience data is measured at short intervals, the audience rating can be obtained more accurately. In addition, in the network 4, if a high speed network such as an optical network, for example, is used, the audience rating can be calculated in real time, so that the digest can be generated in real time. The audience terminal 2 in this embodiment is a terminal of an audience who permitted to provide the audience data for this system at the time of member registration and the like.

The digest image generating apparatus 1 includes a threshold setting part 11, a target program specifying part 12, an audience data obtaining part 13, an audience rating calculation part 14, an extracting determination part 15 and a digest extracting part 16.

The threshold setting part 11 sets a threshold determined by a digest maker on the basis of past audience rating history and/or the number of all terminals. For example, the threshold can be set for each time period such as {between 19 and 20 o'clock, between 20 and 21 o'clock, . . . }, {morning, noon, night, midnight}, each week, each month and the like. The target program specifying part 12 obtains information on a target program from a digest target program list 51 specified by the digest maker.

FIG. 4 shows an example of the digest target program list 51 according to the first embodiment. The digest target program list 51 includes one or more digest target programs that are targets for making a digest. The digest target programs can be specified by the digest maker. For specifying a digest target program, a time period and a channel can be specified as shown in an example of FIG. 4, also, a broadcast station and a time period can be specified. In addition, by preparing the digest target program list including programs of a specific genre, digests for each genre can be generated. Further, the system can be configured such that a genre can be specified from a plurality of genres, so that the system generates a digest including images of programs of the specified genre.

The digest target program list may be held by the digest image generating apparatus 1, or, data of the digest target program list can be obtained from the outside via a network.

The audience data obtaining part 13 obtains audience data from a plurality of audience terminals 2. The audience rating calculation part 14 calculates audience ratings from the audience data obtained by the audience data obtaining part 13, The audience rating at the time t can be calculated by a following equation, Audience rating (*t*)=(Number of audience terminals (*t*) that sent the audience data corresponding to the target program)÷(Number of all audience terminals (*t*)).

(Number of audience terminals (t) that sent the audience data corresponding to target program) is the number of audience terminals receiving the target program at the same time t. The number of all terminals is the number of audience terminals that are targets for calculation of audience ratings. For example, the number corresponds to a number of members of the service of this system.

The extracting determination part 15 compares the audience rating calculated in the audience rating calculation part 14 with a threshold set in the threshold setting part 11. The digest extracting part 16 obtains program content 50 from the broadcasting station 3 in real time, and extracts images corresponding to times at which the audience rating is higher that the threshold. The digest extracting part 16 cuts out images of times at which the audience rating is low. Then, the digest is generated.

FIGS. 5A and 5B are figures for explaining extraction of images as the digest according to the first embodiment of the present invention. FIG. 5A shows examples of audience ratings every 30 seconds for each digest target program. The program ID is information for specifying each digest target program. For example, if the threshold is 20%, the circled parts are extracted. FIG. 5B shows image parts extracted as the digest from the table shown in FIG. 5A.

For generating a digest from a program that has been broadcasted, the digest generating system includes a part for storing the program content 50 temporarily, so that the digest extracting part 16 can obtain the program content from the part. In addition, an image storing apparatus is connected to each audience terminal for playing back a program. In addition, in this case, instead of the viewing time, a relative time elapsing from a starting time in a program is used, so that a digest is generated by using audience ratings.

Figure 6:
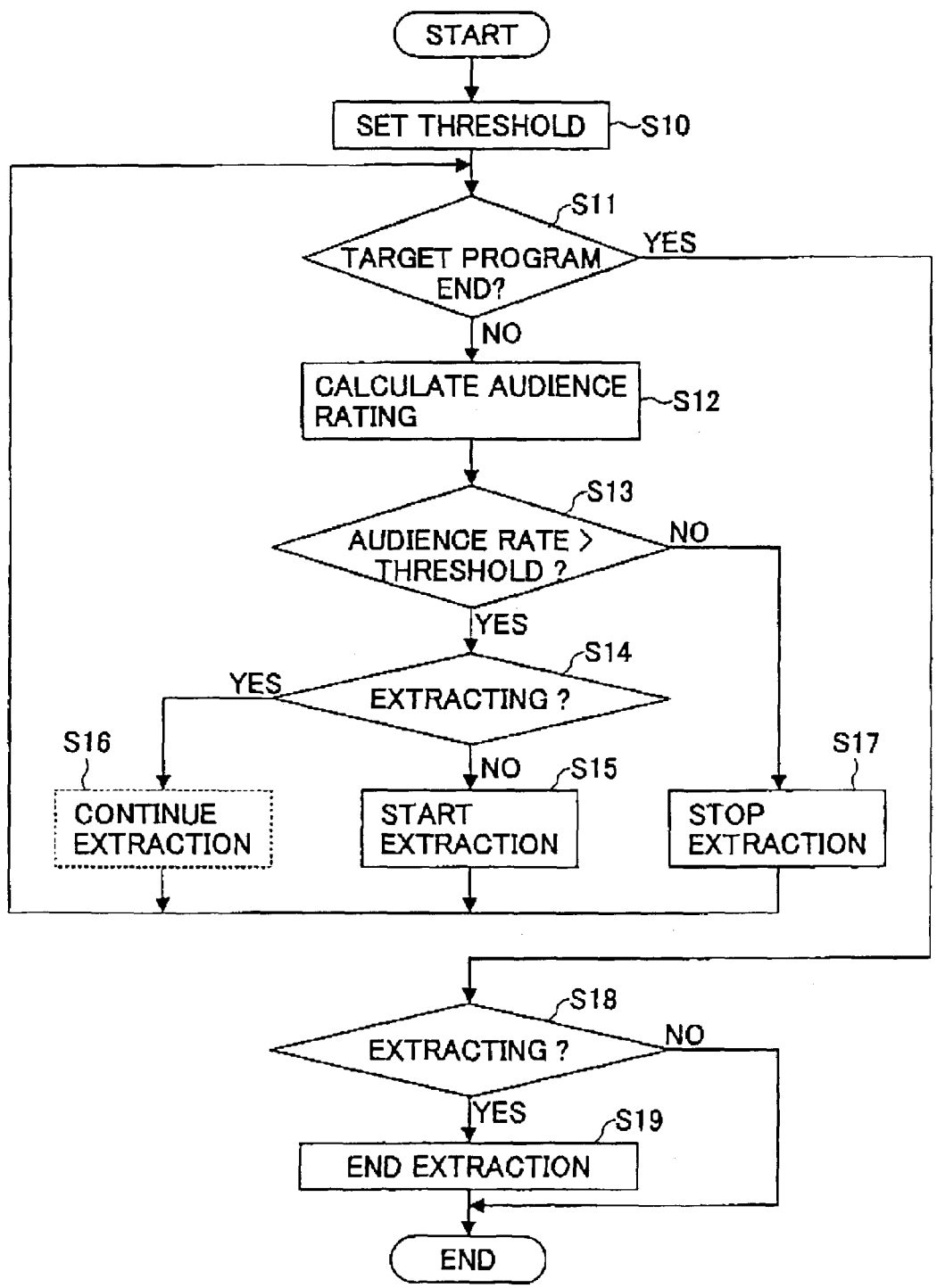
FIG. 6 shows a flowchart showing a procedure for generating a digest according to the first embodiment of the present invention.

FIG. 6 shows a flowchart of a procedure for generating a digest according to the first embodiment of the present invention. In step SC, a digest maker sets thresholds for every time period, for example, according to past audience rating statistics or the number of all terminals. Next, processes after step S11 are repeated (step S11) until the digest target program in the digest target program list ends. If the digest target program ends, the process goes to step S18.

In step S12, the digest image generating apparatus 1 calculates the audience rating on the basis of audience data collected from the audience terminals 2. Next, the digest image generating apparatus 1 compares the audience rating with the threshold in step S13. Then, when the audience rating is higher than the threshold, the digest image generating apparatus 1 checks whether images of the program content are being extracted as the digest in step S14. If the extraction has not been started, the digest image generating apparatus 1 starts to extract images as the digest in step S15, and the process goes back to step S13. If images are being extracted, the images continue to be extracted in step S16, and the process goes back to step S11.

In the determination in step S13, when the audience rating is lower than the threshold, if the images are being extracted, the extraction is stopped. If the extraction has not been started, this state remains (step S17), and returns to step S11.

In step S11, when the digest target program ends, the digest generating apparatus checks whether the current images are being extracted in step S18. If the images are being extracted, the extraction stops in step S19, and the process for generating the digest ends.

Accordingly, images in which the audience rating is higher than the threshold can be extracted, so that the digest can be generated. The digest may be images in which extracted images are connected, or the digest may be individual images.

In the first embodiment, the digest image generating apparatus 1 receives audience data from a plurality of audience apparatuses 2, and calculates the audience rating from the audience data. However, instead of receiving the audience data, the digest image generating apparatus 1 may receive the audience rating from an apparatus that calculates the audience rating, and perform the extracting process of images by using the audience rating.

Second Embodiment

In the second embodiment, after broadcast of a digest generation target program ends, the digest image generating apparatus obtains short images of programs for each of which the maximum audience rating exceeds a threshold. The short image is formed mainly by the original images, and may be climax scenes or promotion images. The short image is prepared beforehand.

Figure 7:
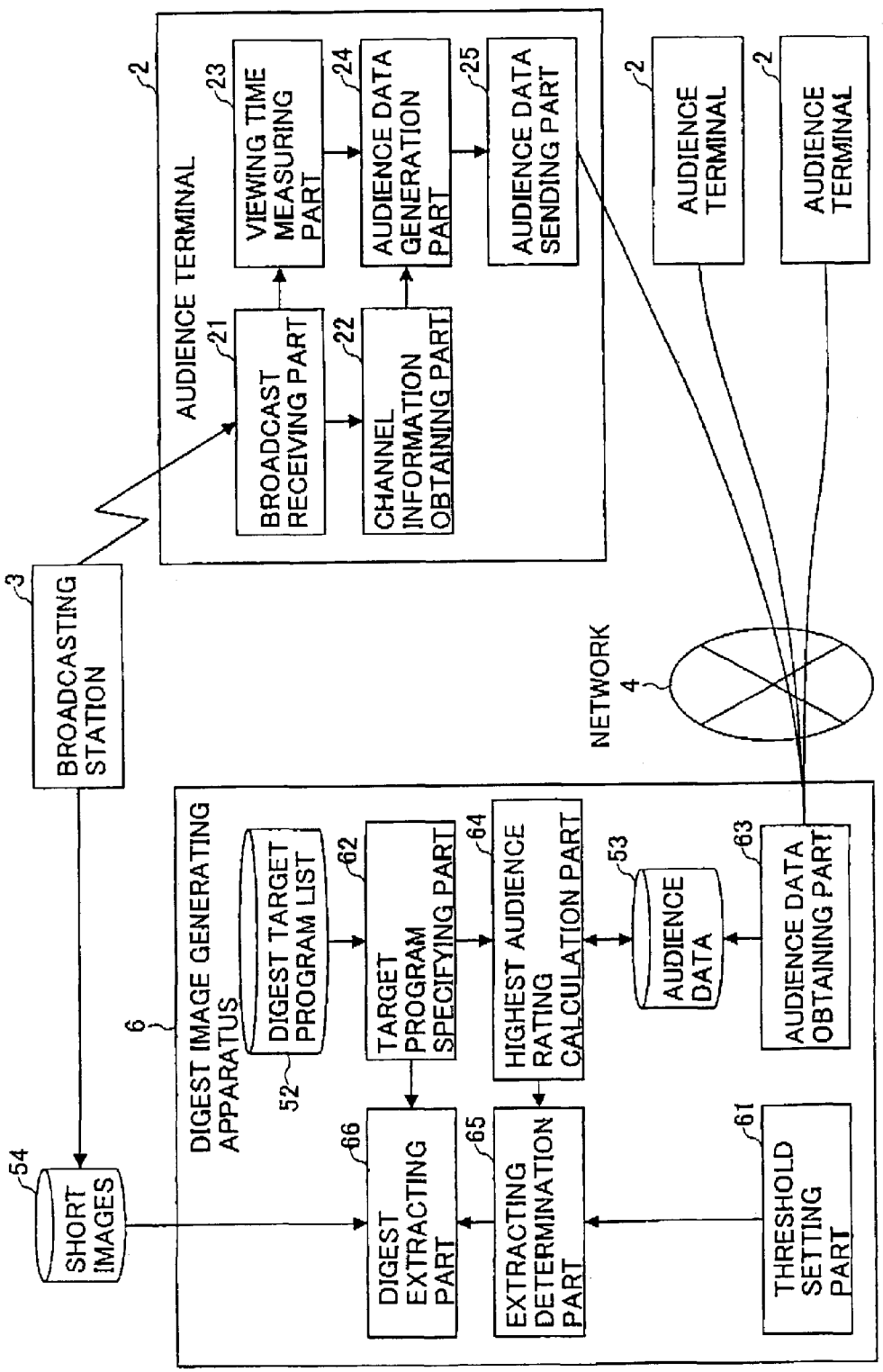
FIG. 7 shows a block diagram of a system according to a second embodiment of the present invention.

FIG. 7 is a block diagram of a system according to the second embodiment. This system includes a digest image generating apparatus 6 for generating a digest, audience apparatuses 2 that are broadcast receiving terminal of each audience, a broadcasting station 3 for providing program content, and a network 4 such as the Internet.

The audience terminal 2 includes a broadcast receiving part 21 for receiving broadcast programs from the broadcasting station 3, a channel information obtaining part 22 for obtaining channel information in which the channel is being watched or listened to, a viewing time measuring part 23 for measuring viewing time, and an audience data generation part 24 for generating audience data including at least channel information and viewing time, and an audience data sending part 25 for sending audience data periodically to the digest image generating apparatus 6 via the network 4. The viewing terminal 2 in this embodiment is a terminal of an audience who permitted to provide audience data.

The digest image generating apparatus 6 includes a threshold setting part 61, a target program specifying part 62, an audience data obtaining part 63, a highest audience rating calculation part 64, a extracting determination part 65 and a digest extracting part 66.

The threshold setting part 61 sets a threshold determined by a digest maker on the basis of past audience rating history and/or the number of all terminals. The object program specifying part 62 obtains information on a target program from a digest target program list 52 specified by the digest maker.

FIG. 8 shows an example of the digest target program list according to the second embodiment. The example shown in FIG. 8 corresponds to a case where a climax scene of a program is obtained from the Internet. The list includes program name, program ID, program content URL (Uniform Resource Locator), time period (time period of climax image), and climax image URL. In this example, by specifying the climax image URL, an image of a climax scene can be obtained. In addition, by preparing a digest target program list including programs of a specific genre, a digest of the genre can be generated.

The audience data obtaining part 63 obtains audience data from the plurality of audience terminals 2, and stores the data as the audience data 53. FIG. 9 shows an example of the audience data 53 in the second embodiment. In this example, the audience data are obtained from each audience terminal 2 at intervals of 30 seconds. Each audience data piece includes viewing time, audience ID and channel information and the like. The channel information is not necessarily a channel number and the like as long as the channel information can specify program content.

The highest audience rating calculation part 64 calculates the highest audience rating for each digest target program on the basis of audience data 53, in which the digest target programs are obtained by the object program specifying part 62 from the digest target program list 52.

The extraction determining part 65 compares the highest audience rating with the threshold set by the threshold setting part 61 for each program. The digest extraction part 66 extracts short images (climax scene or promotion image or the like) for each program whose highest audience rating is higher than the threshold. Programs whose highest audience rating is lower than the threshold are not used for generation of the digest.

When a plurality of pieces of data of short images 54 are set for a program, the short images may be arranged in processing order in a digest, or may be arranged in order of the audience rating.

Figure 10:
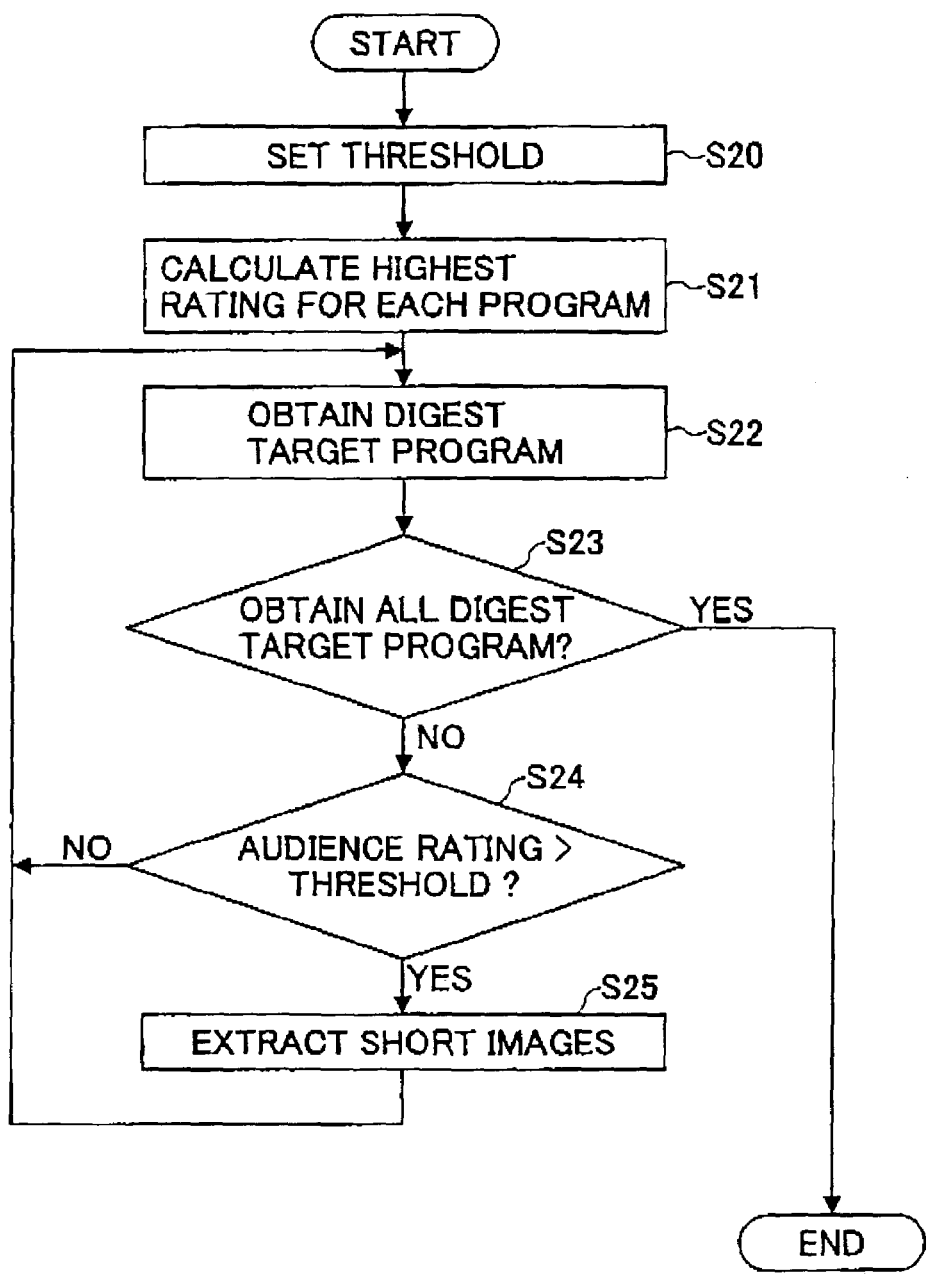
FIG. 10 is a flowchart indicating a procedure of generating a digest according to the second embodiment of the present invention.

FIG. 10 is a flowchart indicating a procedure of generating the digest according to the second embodiment. First, a threshold specified by the digest maker according to past audience rating statistics or estimation from the number of all terminals is set in step S20. Then the digest image generating apparatus calculates the highest audience rating for each program from the audience data received from each audience terminal 2 in step S21.

Next, the digest image generating apparatus obtains the digest target program in the digest target program list one by one in step S22. At this time, if all of the digest target programs have been obtained, and the process for the programs has been ended (step S23), the process ends.

For a digest target program, the highest audience rating is compared with the threshold in step S24. When the highest audience rating is higher than the threshold, the short images 54 are obtained in step S25, and the process goes back to step S22. In step 324, if the highest audience rating is lower than the threshold, the digest is not generated for the program, and the process goes back to step 522.

In the second embodiment, although the highest audience rating is calculated and compared with the threshold for each program, the highest audience rating is not necessarily used as long as the digest can be extracted by using a threshold. For example, the digest image generating apparatus calculates an average audience rating from the start to the end of a program for each program, and the average audience rating is compared with the threshold to obtain the short images, Accordingly, a digest including short images such as climax scenes or promotion images and the like can be generated.

In addition, in the second embodiment, although the digest image generating apparatus 6 receives the audience data from a plurality of audience terminals, and calculates the audience rating from the received audience data, the digest image generating apparatus may obtain the audience rating from an apparatus that calculates the audience rating.

Third Embodiment

In the first and second embodiments, audience ratings are used as an indicator for extracting images to be included in a digest. An audience count can be also used, instead of the audience rating. In the third embodiment, the audience count is used. The audience count is a number of audience data extraction apparatuses corresponding to image viewing apparatuses for playing back images, or a number of audiences if a number of audiences for each audience data extraction apparatus can be obtained. In this third embodiment, images (for example, broadcast program content) that are played back from an image viewing apparatus 90 are the target of digest generation.

Figure 11:
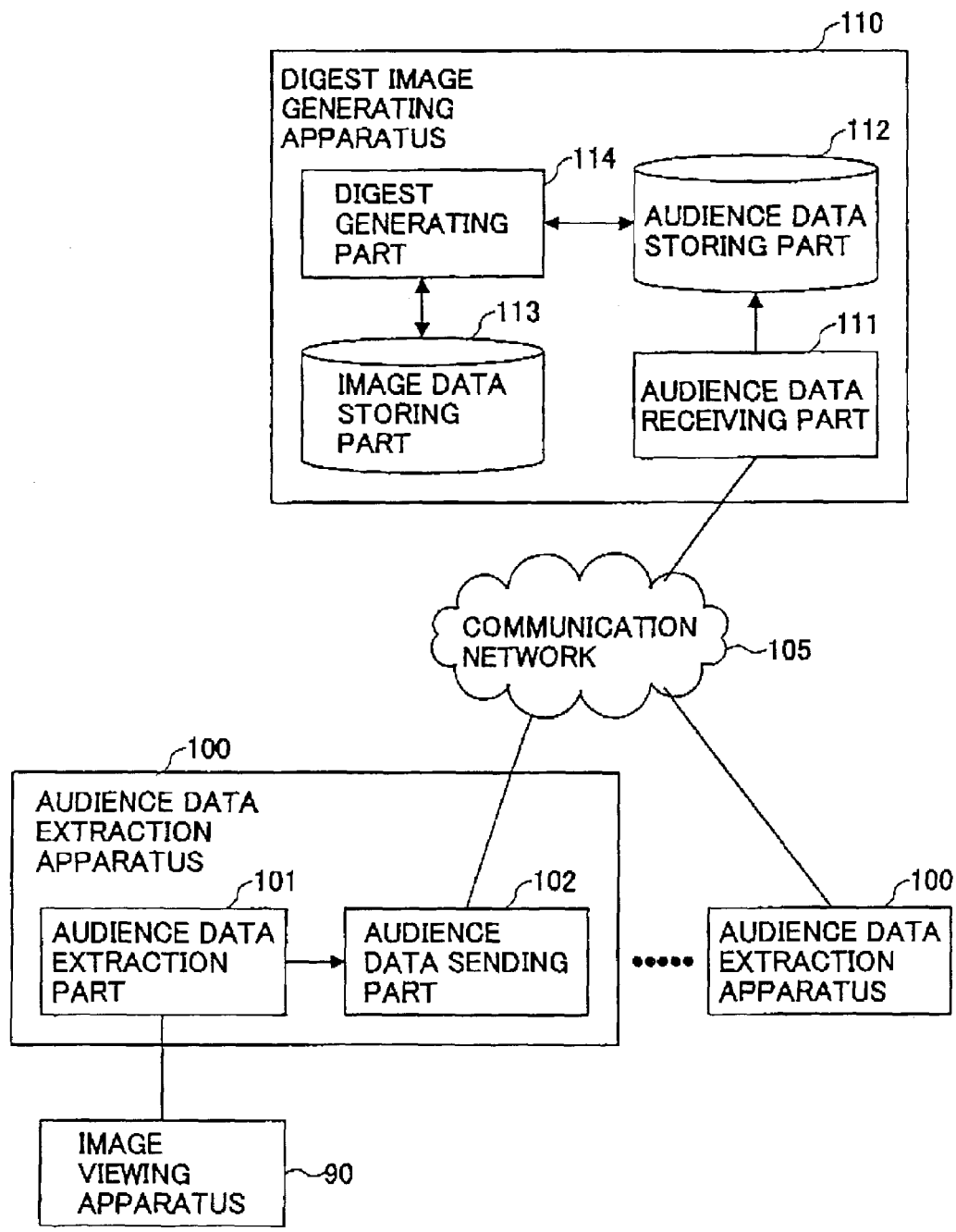
FIG. 11 shows a block diagram of a system according to a third embodiment of the present invention.

FIG. 11 shows a block diagram of a system of this embodiment. As shown in the figure, the system includes an audience data extraction apparatus 100 for obtaining audience data sent from the image viewing apparatus 90 and sending the audience data, and a digest generating apparatus 110 for generating a digest on the basis of audience data sent from a plurality of audience data extraction apparatus 100.

The audience data extraction apparatus 100 includes an audience data extraction part 101 and an audience data sending part 102. The audience data extraction part 101 extracts audience data from the image viewing apparatus 90. The audience data includes information on "jump" and/or "search" used for image search when the audience is watching or listening to image content, information indicating skipped part, and information indicating played-back part relating to "jump" and/or "search", and content ID for specifying image content that is currently watched or listened to.

Figure 12:
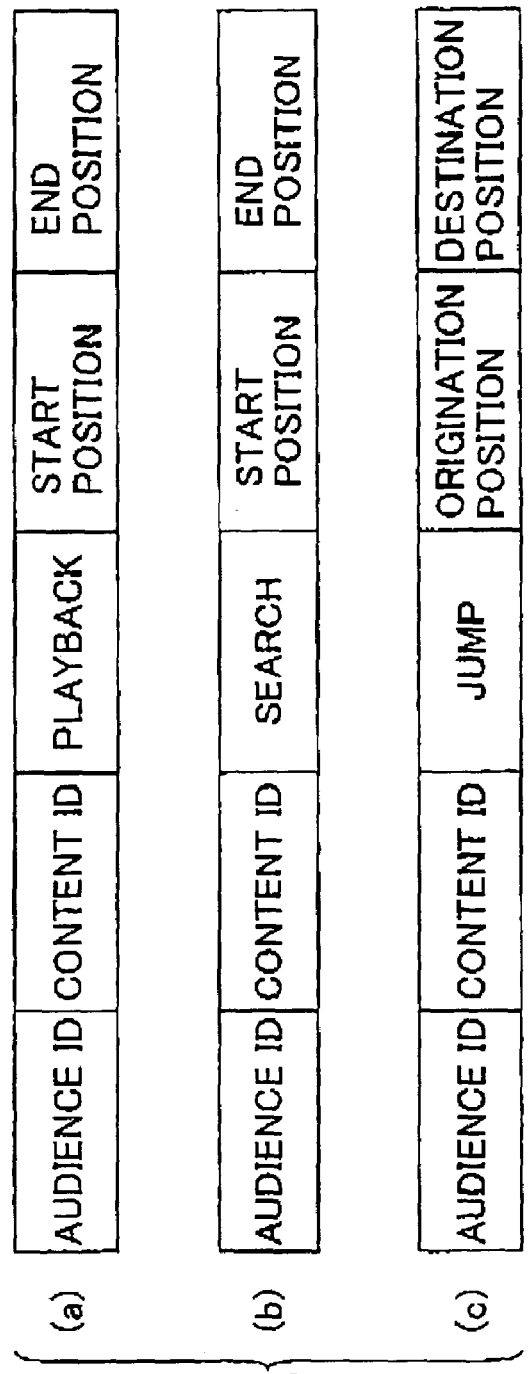
FIG. 12 show s a configuration example of audience data according to the third embodiment of the present invention.

FIG. 12 shows a configuration example of the audience data. Information of (a) indicating "playback" is reflected on an after-mentioned histogram, and the information of "jump" and "search " is not reflected on the histogram.

The image viewing apparatus 90 is an apparatus for playing back image content, such as a DVD player, a videocassette recorder, a STB for VOD for receiving images from a broadcasting station or via a network. That is, "images" in this embodiment includes images distributed by broadcasting, images distributed via a network, images played back from a package medium and the like.

The audience data sending part 102 sends extracted audience data to the digest image generating apparatus 110 via a network 105.

The digest image generating apparatus 110 includes an audience data receiving part 111 for receiving audience data sent from a plurality of audience data extraction apparatuses via the network 105, an audience data storing part 112 for storing the audience data for each audience data extraction apparatus or each audience, an image data storing part 113 for storing image content same as the image content played back by the image viewing apparatus 90.

The digest generating part 114 extracts, among pieces of audience data stored in the audience data storing part 112, pieces of audience data corresponding to target image content for which a digest is to be generated. Then, the digest generating part 114 generates a histogram of audience counts, in which the histogram indicates how many audiences watched or listened to the target image content for each time unit. The number of corresponding audience data extraction apparatuses can be used for the number of audiences. After that, the digest generating part 114 identifies images in which the audience count is higher than a threshold, extracts the images from the image data storing part 113, and edits the images by connecting them into a digest.

In this embodiment, although the image viewing apparatus 90 and the audience data extraction part 100 are separated, the image viewing apparatus 90 may include the audience data extraction apparatus 100. The image viewing apparatus 90 that includes the audience data extraction apparatus 100 corresponds to the audience apparatus in the first and second embodiments.

In addition, the audience data receiving part 111 and the audience data storing part 112 can be provided in an apparatus separated from the digest image generating apparatus 110. In this case, the digest image generating apparatus 110 obtains and uses the audience data from the apparatus. In addition, the image data storing part 113 can be placed outside of the digest generating apparatus 110.

Figure 13:
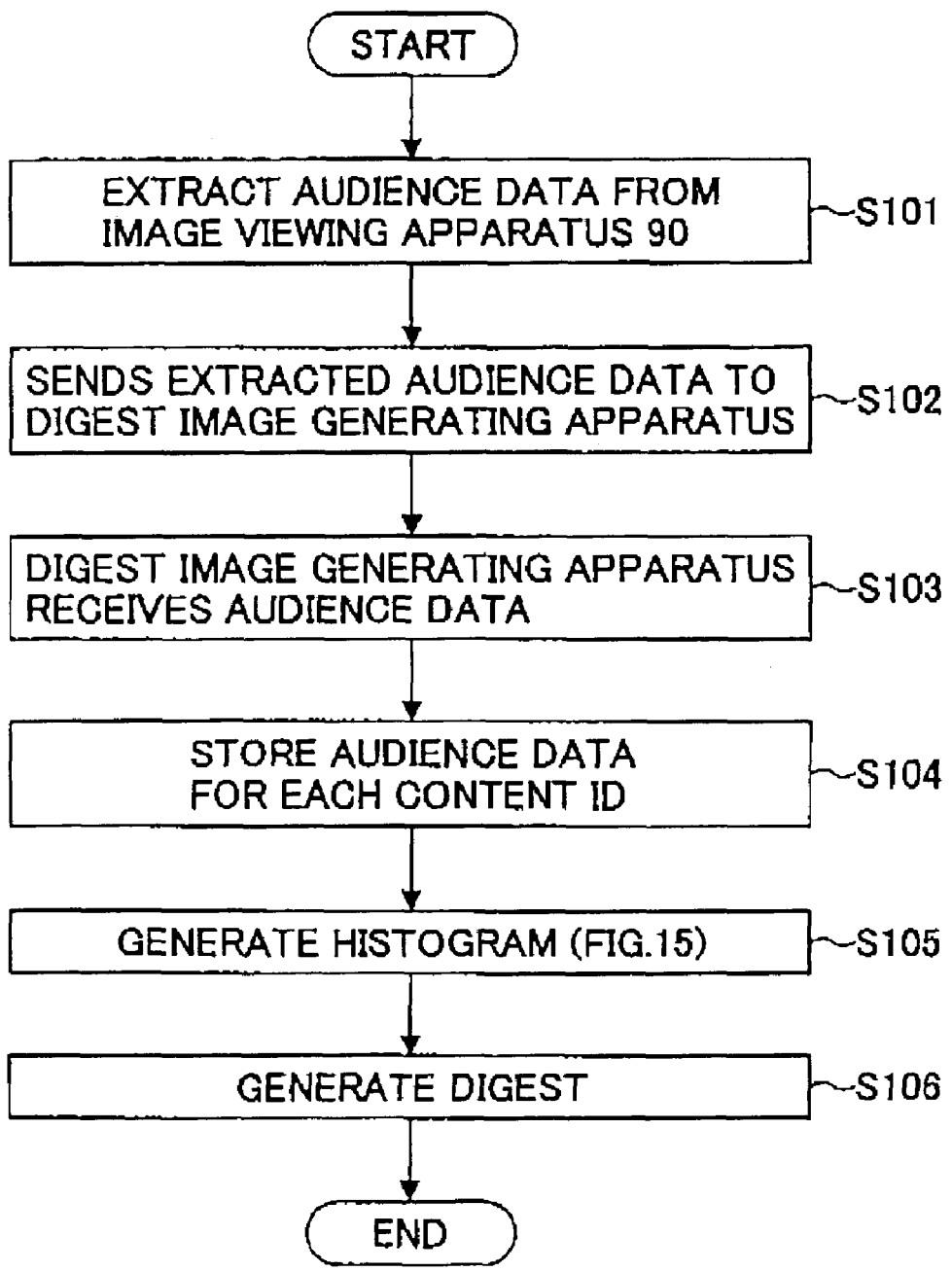
FIG. 13 shows a process flowchart of a system according to the third embodiment of the present invention.

FIG. 13 shows a process flow of the system of the third embodiment. First, the audience data extraction apparatus 100 extracts audience data from the image viewing apparatus 90 in step S101. The extraction of the audience data is performed in real time at the same time when the audience watches or listens to the image content. The audience data can be also obtained from the image viewing apparatus collectively after the image is watched or listened to.

Then, the audience data sending part 102 in the audience data extraction apparatus 100 sends the extracted audience data to the digest image generating apparatus 110 via the network 105 in step S102. The network 105 can be either a wired network or a radio network, and can be any type of network as long as the audience data can be sent via the network 105.

Figure 14:
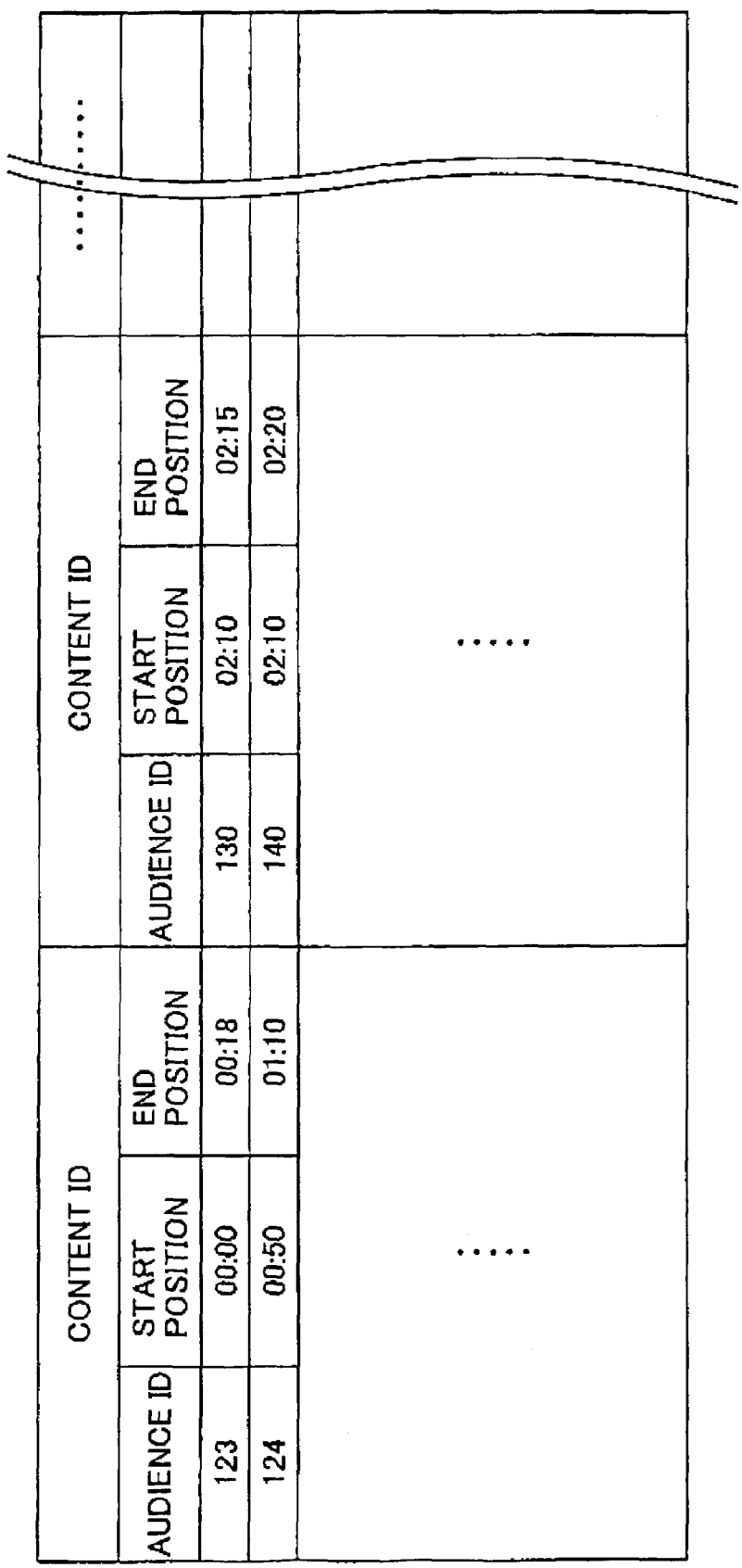
FIG. 14 shows an example of audience data stored in an audience data storing part 112 according to the third embodiment of the present invention.

Next, the digest generating apparatus 110 receives the audience data from a plurality of audience data extraction apparatuses 100 via the network 105 in step S103. The received data are stored in the audience data storing part 112 content by content (for example, broadcasted program content, movie content and the like) in step S104. FIG. 14 shows an example of the audience data stored in the audience data storing part 112. In the example shown in FIG. 14, audience data corresponding to "playback" is stored one after another for each content ID.

Then, the digest generating apparatus 110 generates a histogram by using the stored audience data in which count of audience data is accumulated at a time position in the image content in step S105, wherein the time position indicates a time when the audience watched or listened to the image content. A procedure for generating the histogram will be described with reference to FIG. 15 later.

The digest image generating apparatus 110 obtains images of the target image content stored in the image data storing part 113, in which the images to be obtained are selected on the basis of the histogram. Then, the digest image generating apparatus 110 connects the images so as to generate a digest in step S106.

Figure 15:
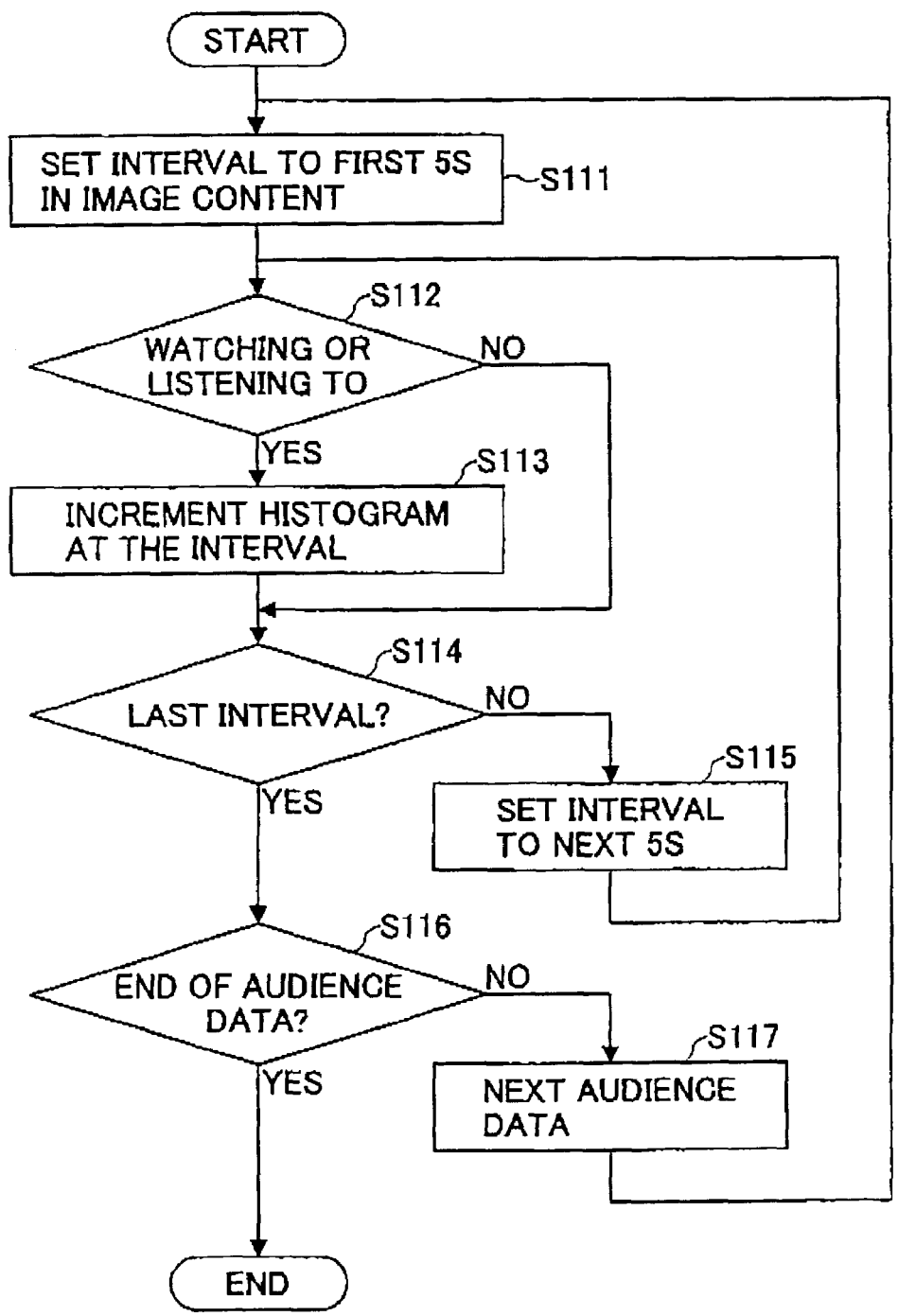
FIG. 15 shows a flowchart indicating a procedure for generating a histogram according to the third embodiment of the present invention.

FIG. 15 shows a flowchart indicating a procedure for generating the histogram according to the third embodiment of the present invention. In this procedure, processes of steps S111-S115 are performed for each piece of the audience data, and the histogram is generated.

For a first piece of audience data, a viewing determination interval is set to be first five seconds in the target image content in step S111. The interval of five seconds is an example, and the interval may be any length. In the determination interval, when the piece of the audience data represents those images viewed at the time interval, the position of the interval of the histogram is incremented in steps S112-S113. That is, when the piece of the audience data includes time information corresponding to the interval and a content ID corresponding to the target image content, the histogram is incremented at the interval. When the piece of the audience data does not represent that images of the interval were viewed, the process goes to step S114.

After that, the digest image generating apparatus 110 determines whether the viewing determination interval is the last interval of the image content in step S114. If the viewing determination interval is not the last interval, a next five seconds is set as the viewing determination interval in step S115. When determination whether images are viewed or not completes throughout the target image content for the first piece of the audience data, the same processes are performed for the next piece of audience data. The same processes are performed for all pieces of audience data in steps S116-S117.

Figure 16:
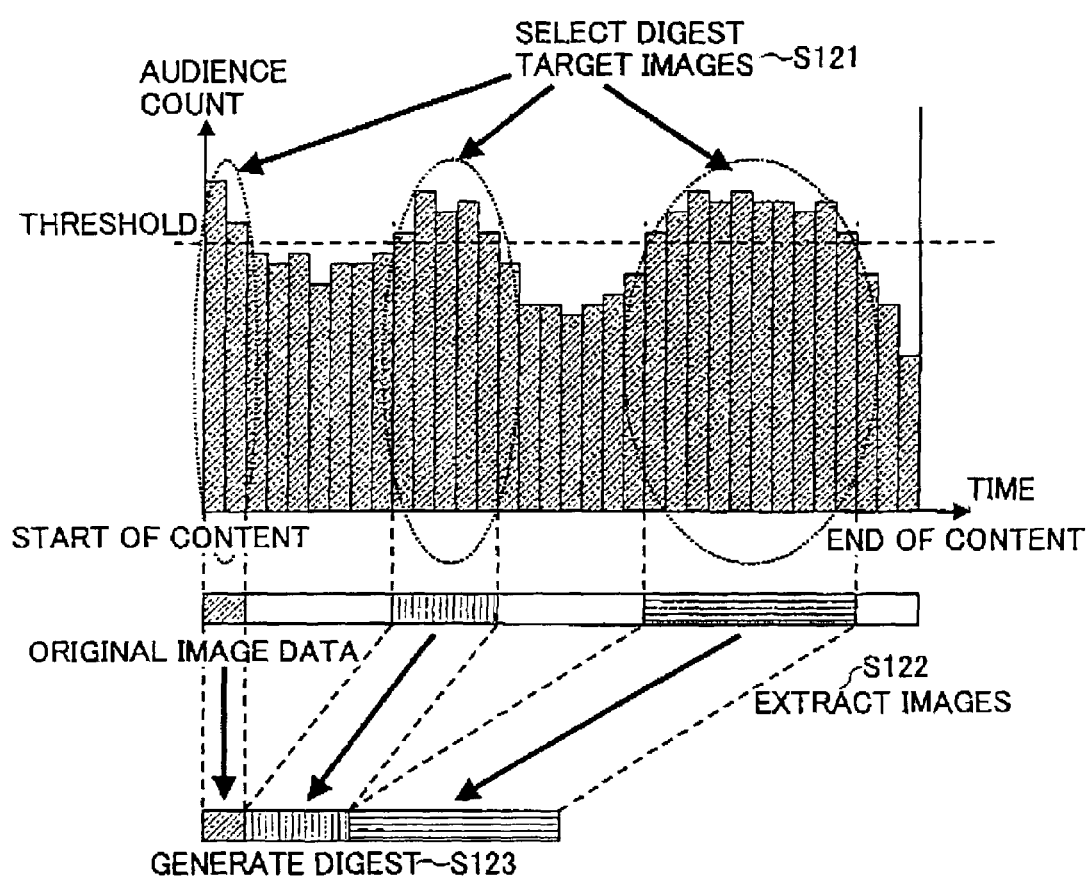
FIG. 16 is a figure for explaining a procedure for generating a digest according to the third embodiment of the present invention.

FIG. 16 is a figure for explaining a procedure for generating a digest according to the third embodiment.

For generating a digest, time intervals in which the audience count is greater than a threshold are selected in the histogram in step S121, and images corresponding to the time intervals are extracted from the image data storing part 113 in step S122. Then, the extracted images are connected so that a digest is generated in step S123. The threshold is predetermined on the basis of past audience count statistics, the number of all audiences and the like. The threshold may be an absolute number (for example, an interval where more than 100 audiences viewed are extracted). Also, the threshold may be a number considering the number of all audiences. The threshold determined in consideration of the number of all audiences is equivalent to a threshold of audience rating.

In addition, by using the number of all audiences, a graph on the basis of audience ratings can be obtained from the histogram. Thus, the digest can be generated on the basis of the audience rating in the same way as the first and second embodiments.

In addition, although the digest image generating apparatus generates the histogram on the basis of the audience data, the digest generating apparatus can obtain the histogram from the outside instead of generating the histogram.

As mentioned above, since the images that are watched or listened to by audiences exceeding a threshold can be selected as a digest, an effective digest can be generated in which audiences' interests are reflected. Also in the third embodiment, like the second embodiment, the digest can be generated by using short images for programs of which the maximum audience rating exceeds a predetermined threshold.

As mentioned above, according to the first to third embodiments, by extracting images of which audience rating is high, or by extracting images that are watched or listened to by many audiences, a digest that consists of scenes in which the audiences are interested can be automatically generated. In addition, by using the short images such as climax scenes and/or promotion images for programs having high audience rating or high audience count, the digest can be used as advertisement for stored image content, such as packaged media, video-on-demand and the like.

Fourth Embodiment

In the fourth embodiment, the digest is generated by using audience data of audiences corresponding to a specific user profile, in which the user profile is gender, age and the like of audiences.

That is, for the system of the first and second embodiments, the audience ratings are obtained by using audience data of audiences corresponding to a specific user profile, and images are extracted on the basis of the audience ratings for generating the digest. For the system of the third embodiment, the audience counts are obtained by using audience data of audiences corresponding to a specific user profile, and images are extracted on the basis of the audience counts for generating the digest.

In the following, the fourth embodiment will be described specifically on the basis of the system of the third embodiment as an example.

Figure 17:
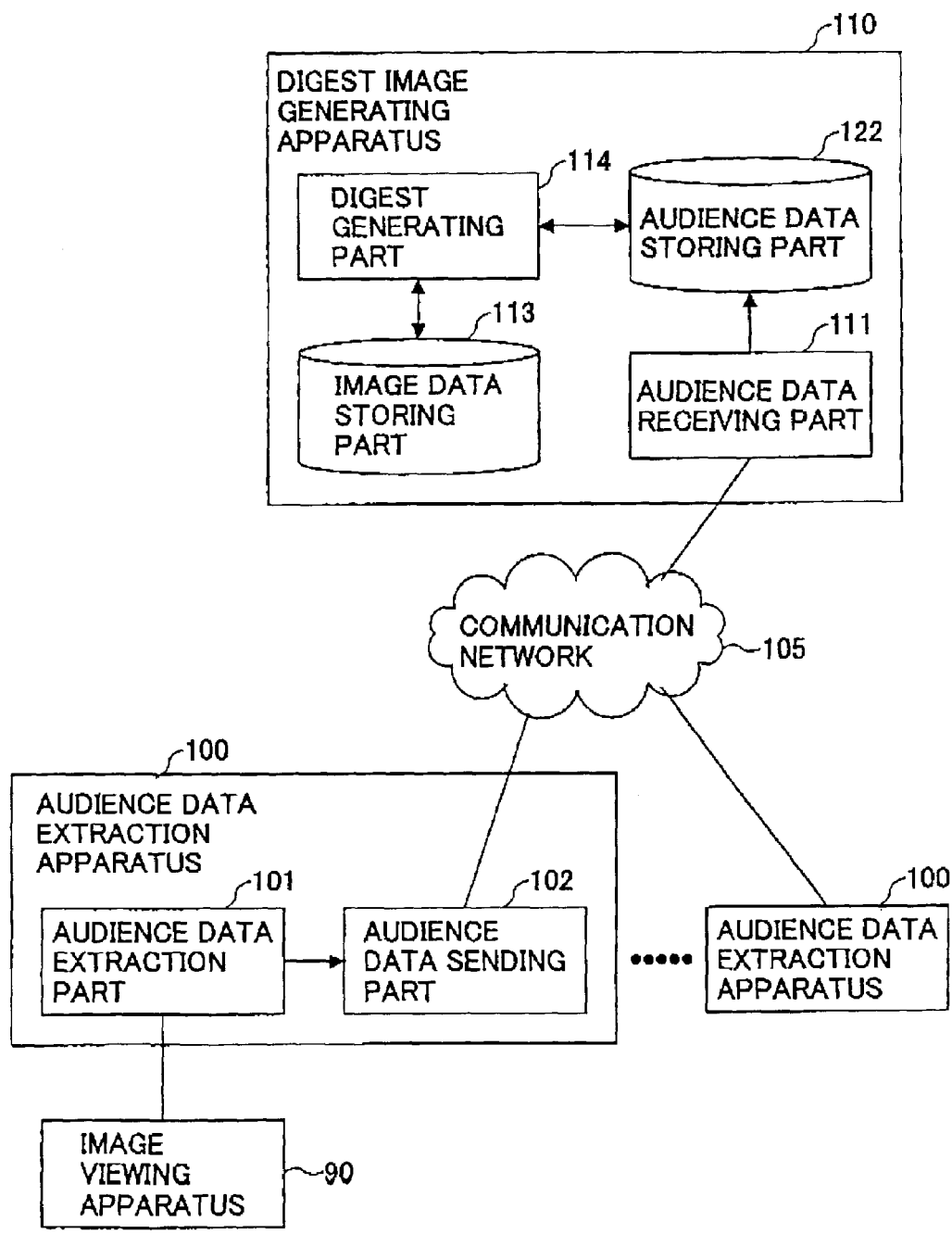
FIG. 17 shows a block diagram of a system according to a fourth embodiment of the present invention.

FIG. 17 shows a block diagram of a system according to the fourth embodiment of the present invention. The same numerals are assigned to the same parts as those of the third embodiment.

In the system of the fourth embodiment, an audience data storing part 122 is used instead of the audience data storing part 112 in the system of the third embodiment, in which the audience data storing part 122 stores not only audience data but also user profiles of audiences such as the area where the image viewing apparatus 90 exists, gender, age of audiences who use the image viewing apparatus 90. At the time of generating a histogram, the digest generating part 114 generates a histogram in which target audiences are narrowed, and generates a digest on the basis of the histogram. FIG. 18 shows an example of the user profile stored in the audience data storing part 122.

Figure 19:
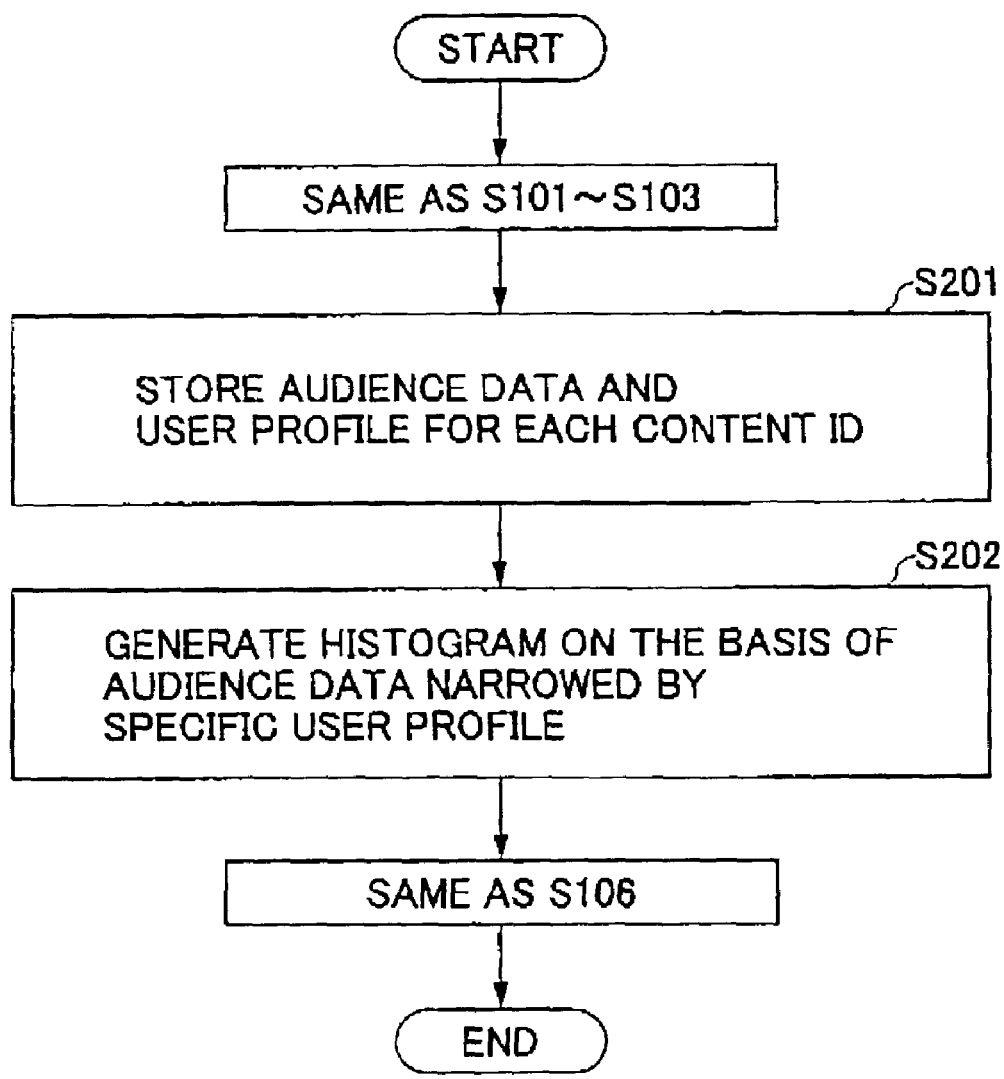
FIG. 19 shows an operation flowchart of a system according to the fourth embodiment of the present invention.

That is, for example, a digest can be generated for audiences living in a specific area. In addition, for example, a digest can be generated for twenty-something audiences FIG. 19 shows an operation flowchart of the system according to the fourth embodiment of the present invention. The operation of the system in the fourth embodiment will be described with reference to FIG. 19.

After the digest image generating apparatus 110 receives audience data (same as steps S101-S103), the digest image generating apparatus 110 stores the audience data and stores user profiles for each audience such as area where the audience lives, age, gender and the like in step S201. Then, the digest generation part 114 generates a histogram by using the audience data corresponding to audiences narrowed into a specific range, such as audiences in a specific area, or audiences of a specific age bracket or a specific gender in step S202. Then, the digest generation part 114 generates a digest on which audiences' preferences are reflected. The method for generating a digest is the same as that of the third embodiment (step S106).

The user profile that is used for narrowing the audiences may be a combination of a plurality of conditions, such as a combination of age and area. In addition, any parameter that can narrow audiences to a range can be used as the user profile.

The user profile can be received from the audience data extraction apparatus at the time when receiving audience data. In this case, for example, the audience inputs the user profile into the audience data extraction apparatus by using an IC card and the like, then, the audience data extraction apparatus sends the input user profile. In addition, for example, an IDs of an audience data extraction apparatus and corresponding user profile are stored beforehand in the digest image generating apparatus or in an apparatus that the digest generating apparatus can access, and the audience data extraction apparatus sends only ID when sending audience data. In addition, the user profile can be stored in a storing apparatus in the digest generating apparatus 110, for example, at the time of user registration.

Fifth Embodiment

In the fifth embodiment, by using an excluding filter, the digest image generating apparatus excludes images specified by the excluding filter from a digest. The excluding filter can be applied to any of the first to third embodiments. In the following, an example in which the excluding filter is applied to the system of the third embodiment will be described, as the fifth embodiment.

Figure 20:
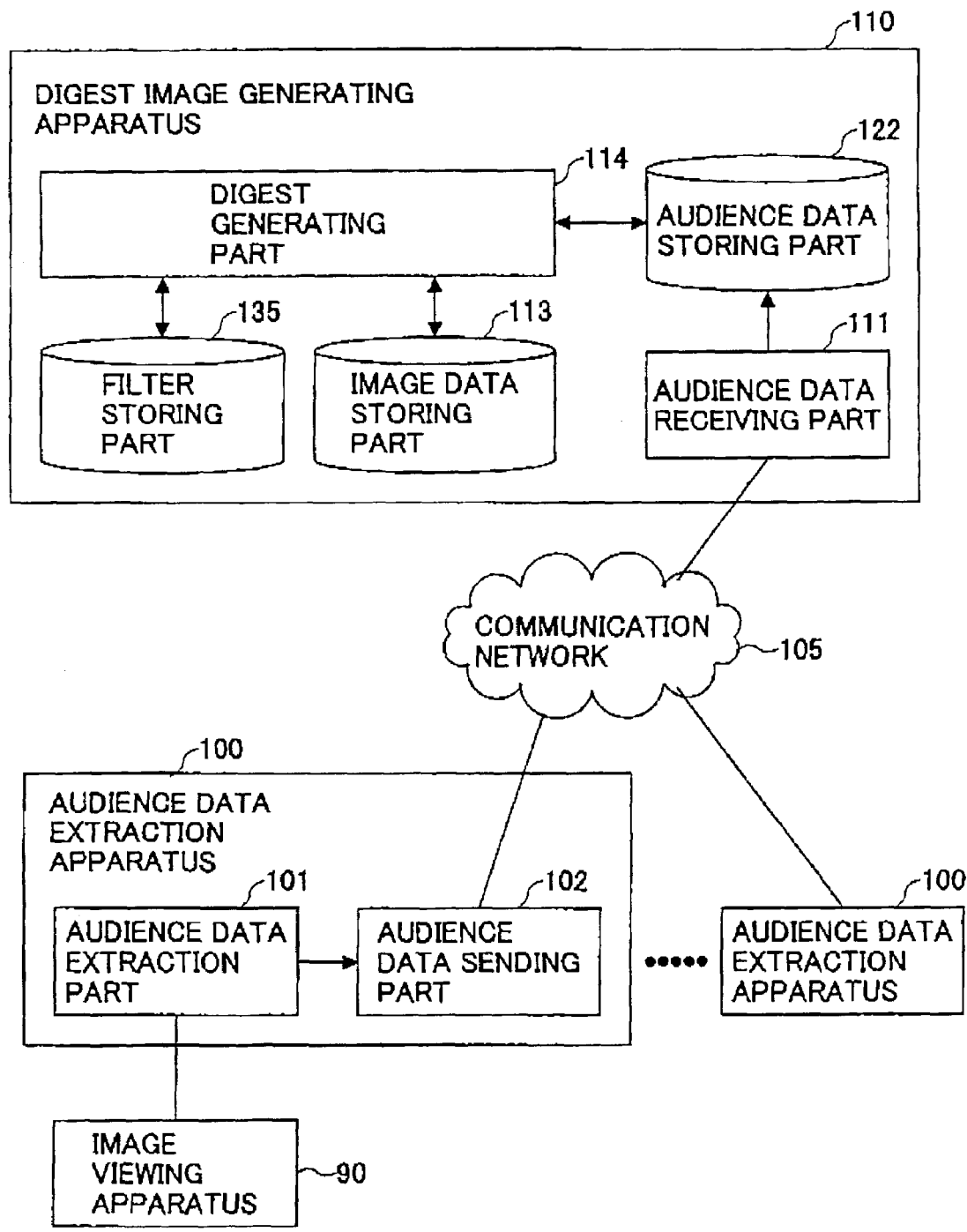
FIG. 20 is a block diagram of a system according to a fifth embodiment of the present invention.

FIG. 20 is a block diagram of a system according to the fifth embodiment of the present invention. The system of the fifth embodiment includes a filter storing part 135 that stores the excluding filter, in addition to the configuration of the third embodiment or the fourth embodiment. The excluding filter indicates time intervals in image content that should be excluded from a digest. The excluding filter is provided for each piece of image content as necessary. This excluding filter includes one or more intervals (such as "start time-end time") each of which interval indicates images that should be excluded from a digest.

Figure 21:
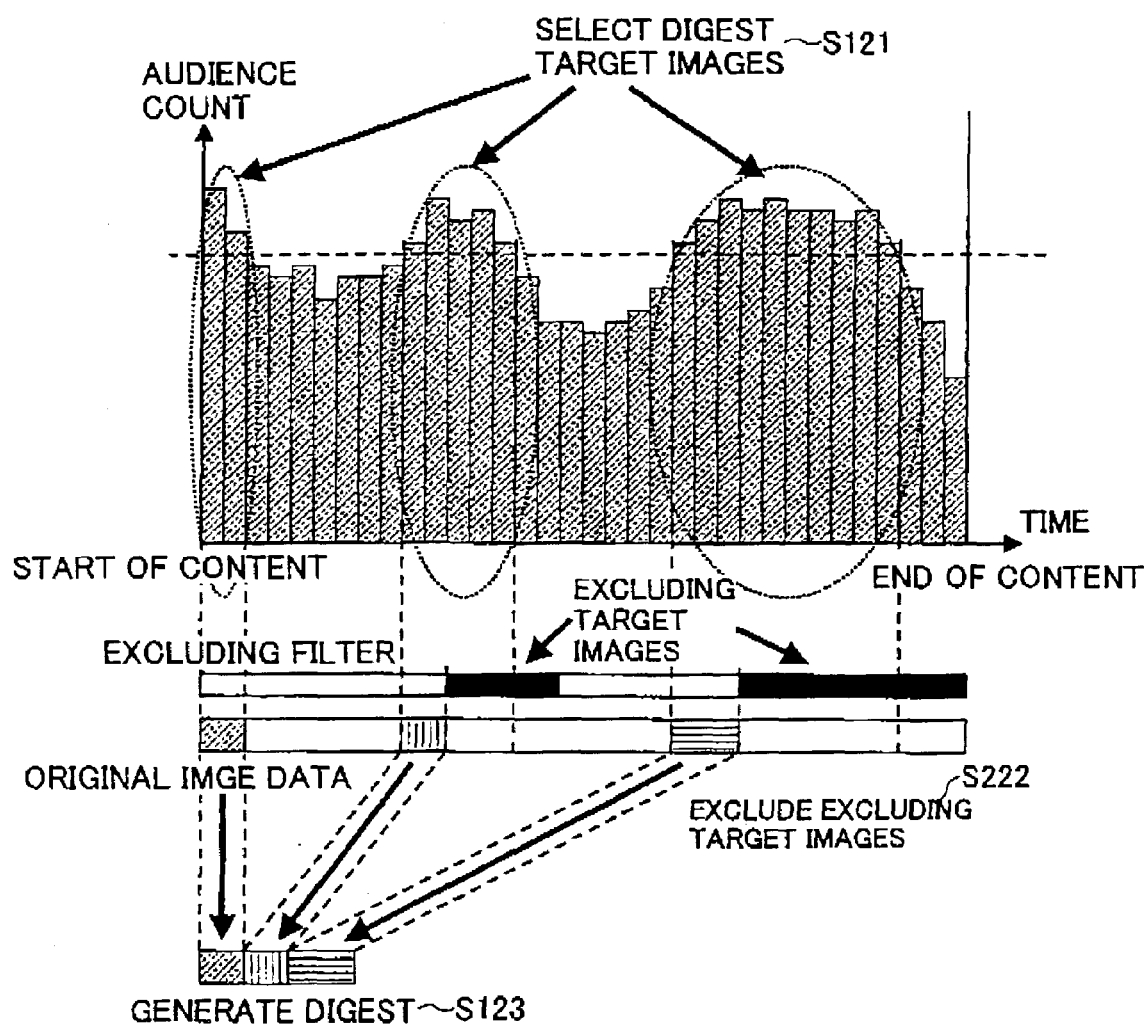
FIG. 21 is a figure for explaining a procedure for generating a digest in the fifth embodiment of the present invention.

FIG. 21 is a figure for explaining a procedure for generating a digest in the fifth embodiment of the present invention.

After digest target images that may be included in the digest are selected from the histogram in step S121, the digest image generating apparatus excludes images (digest excluding images), that should be excluded from the digest, from the digest target images in step S222 by using the excluding filter. Then, a digest is generated in which the digest excluding images are excluded in step S123.

As mentioned above, by using the excluding filter, the digest image generating apparatus can exclude, from a digest, specific images, in which, if the specific images are to be viewed by audiences before original image content is distributed or at an initial stage of distribution, the original image content would not affect the audiences strongly. As a result, digest distribution having the opposite effect of advertisement can be avoided.

The excluding filter can be changed at specified intervals after the original image content is distributed, so that different excluding filters can be used. Accordingly, for example, it becomes possible to increase scenes gradually in the digest by releasing the excluding filter, so that, a digest including effective scenes can be generated such that audiences are interested in the digest, even if the audience is not interested in an initial digest.

Sixth Embodiment

In the sixth embodiment, by using a priority filter indicating images to be included preferentially in a digest, the digest image generating apparatus preferentially includes images specified by the priority filter in a digest. The priority filter can be applied to any of the first to third embodiments. In the following, an example in which the priority filter is applied to the system of the third embodiment will be described as the sixth embodiment.

The system of the sixth embodiment includes the filter storing part 135 that stores the priority filter, in addition to the configuration of the third embodiment or the fourth embodiment, in which the priority filter indicates images that are preferentially included in a digest. That is, the system of the sixth embodiment includes the priority filter instead of the excluding filter in the filter storing part 135 in the system shown in FIG. 20.

Figure 22:
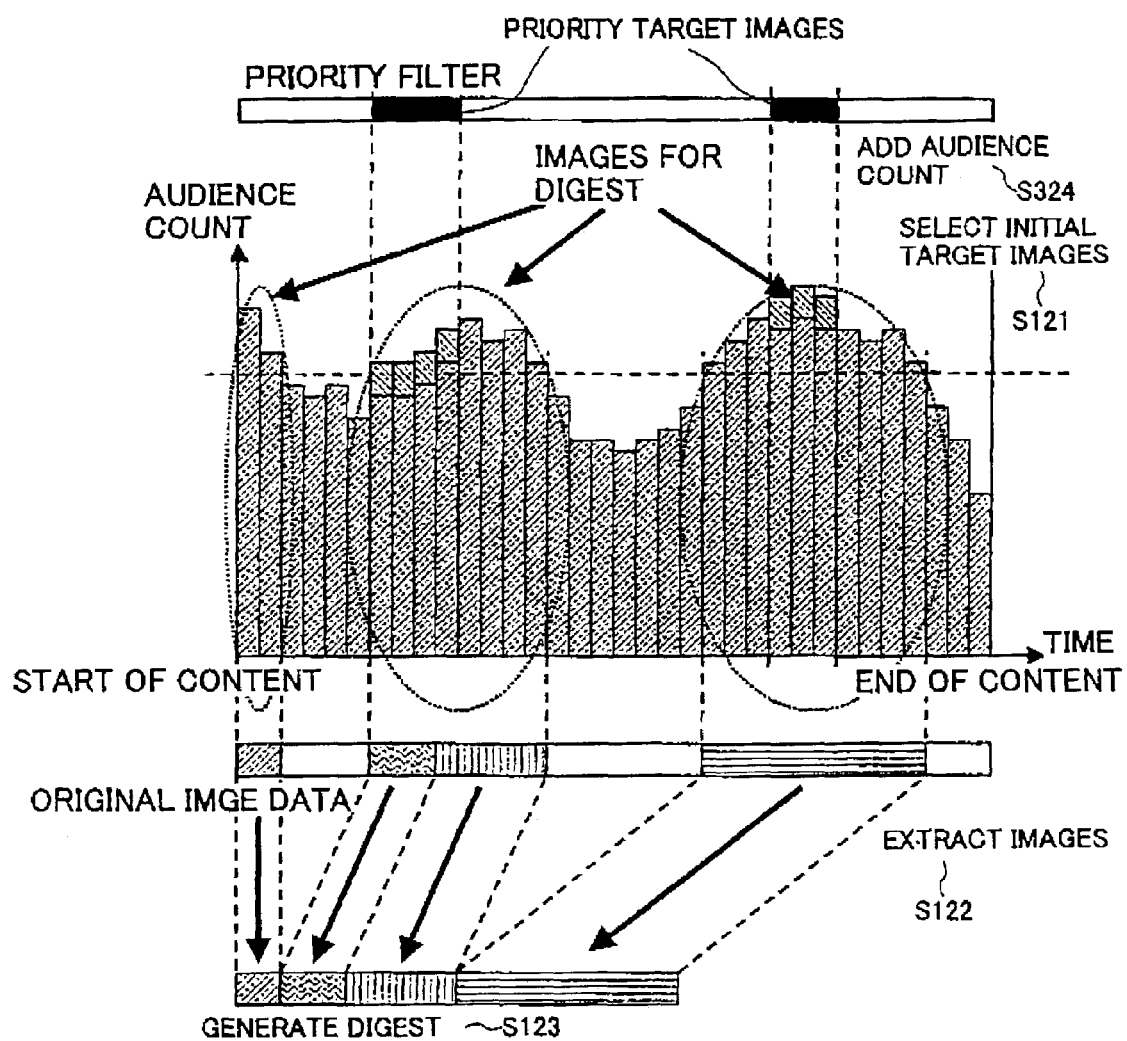
FIG. 22 is a figure for explaining a procedure for generating a digest in a sixth embodiment of the present invention.

FIG. 22 is a figure for explaining a procedure for generating a digest in the sixth embodiment of the present invention.

After digest target images that may be included in the digest are selected from the histogram in step S121, the digest image generating apparatus generates a new histogram by adding a count on images specified by the priority filter in step S324. Then, the digest image generating apparatus selects new digest target images by using the modified histogram so as to generates a digest in step S123. For applying this method to the system of the first embodiment, a value of audience rating is added.

According to this embodiment, by setting the priority filter properly, a specific scene can be included in the digest preferentially according to intentions of a sponsor or an agency that an actor belongs to, in which, for example, the specific scene is a scene in which an actor who the sponsor wants to include in the digest appears, or the specific scene is a scene that is specifically made for a digest.

The priority filter can be changed at specified intervals after the original image content is distributed, so that different priority filters can be used. As a result, for example, even if an initial digest is generated only on the basis of sponsor's intentions, the digest can be regenerated such the digest reflects audiences' interests. In addition, images that could not be included in a digest can be gradually included in a digest, so that the digest can be changed effectively.

Modification of the Fifth and Sixth Embodiments

In the same way as the excluding filter in the fifth embodiment, the priority filter of the sixth embodiment can be configured such that images specified by the priority filter are always included in a digest. On the other hand, in the same way as the priority filter of the sixth embodiment, the excluding filter can be configured such that an audience count is decreased in the histogram on images specified by the excluding filter.

In addition, without differentiating between the excluding filter and the priority filter, the digest image generating apparatus can use a filter for increasing or decreasing an audience count on one or more time intervals of images throughout the whole image content. In this case, the unit of the count to be increased or decreased is not necessarily "1". For example, the count can be a large number to be added for images that should be included in the digest, and can be a large number to be decreased for images that should not be included.

Seventh Embodiment

In the seventh embodiment, a digest is generated considering whether audiences have watched or listened to the digest. The process method of this embodiment can be applied to any system of the first to third embodiments. In the following, an example based on the system of the third embodiment will be described as the seventh embodiment.

Figure 23:
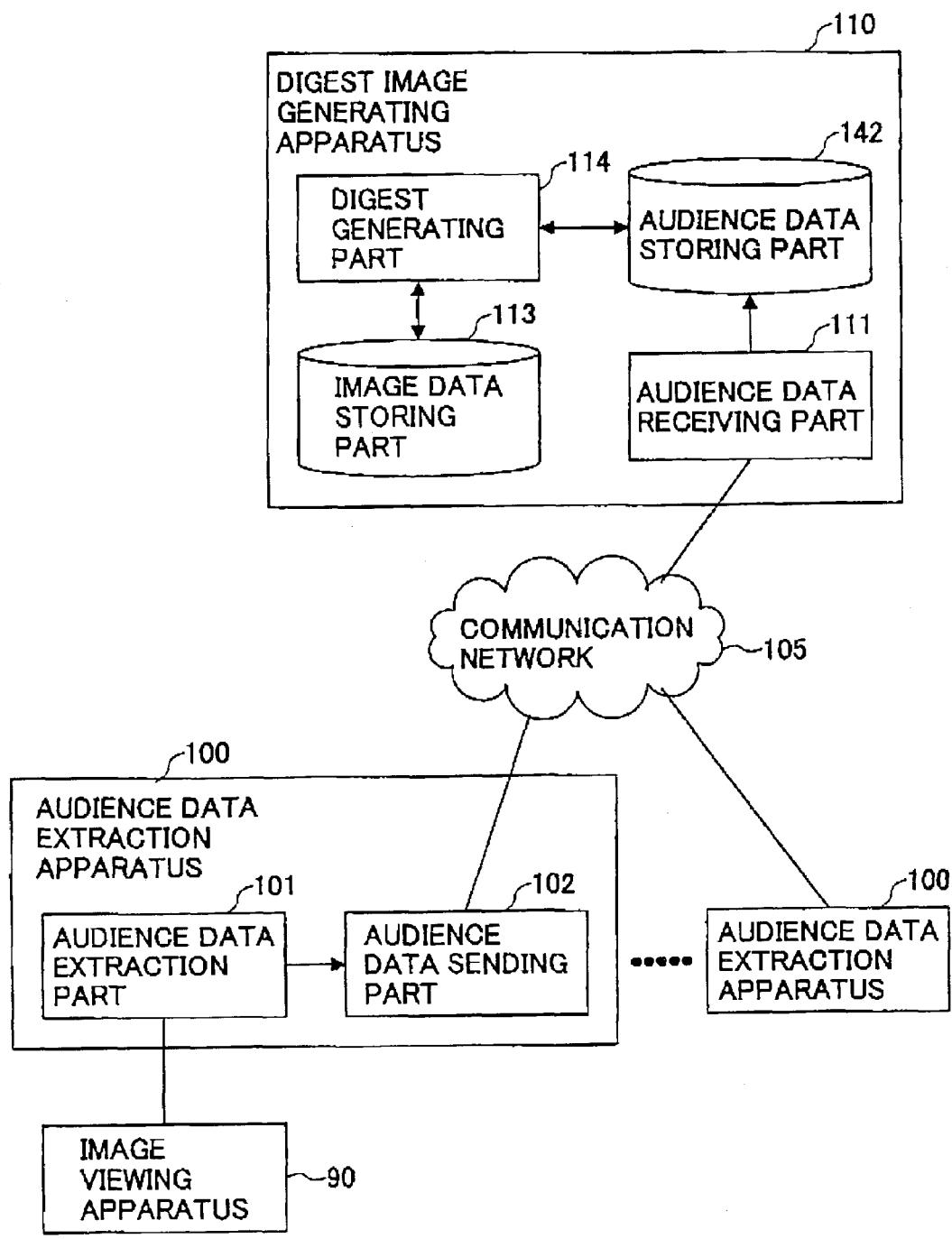
FIG. 23 is a block diagram of a system of a seventh embodiment of the present invention.

FIG. 23 is a block diagram of a system of the seventh embodiment of the present invention. In the seventh embodiment, an audience data storing part 142 is used instead of the audience data storing part 122 in the system of the fourth embodiment shown in FIG. 17, in which the audience data storing part 142 stores not only the audience data and the user profile for each piece of image content, but also information indicating whether an audience has viewed a digest corresponding to the image content before.

The digest generating part 114 generates a histogram targeted for audiences who have watched or listened to the digest and a histogram targeted for audiences who have not watched or listened to the digest, obtains differences between the histograms, and regenerates, by factoring in the differences, a digest from the original digest, for example, generated under a normal condition.

Figure 24:
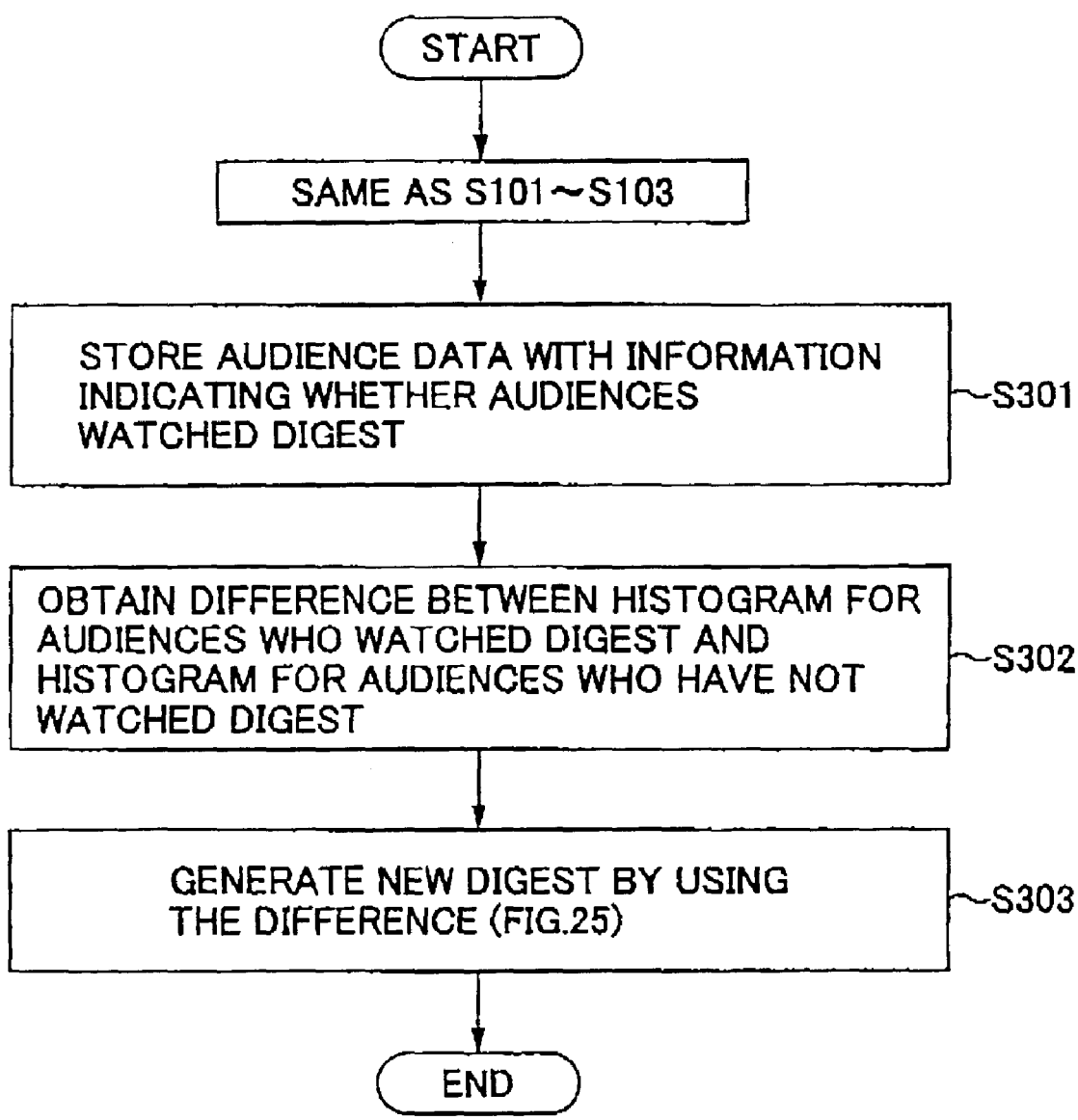
FIG. 24 is an operation flowchart of a system of the seventh embodiment of the present invention.

FIG. 24 is an operation flowchart of the system of the seventh embodiment of the present invention.

After receiving audience data from a plurality of audience data extraction apparatuses (steps S101-S103), the digest image generating apparatus stores the audience data in the audience data storing part 142, and, at the same time, stores information indicating whether the audience has watched or listened to a digest in step S301. When newly generating a histogram, the digest generating part 114 generates a histogram targeted for audiences who have watched or listened to the digest and a histogram targeted for audiences who have not watched or listened to the digest, and obtains difference between the histograms in step S302. After that, the digest generating part 114 generates a new digest by determining images to be added or images to be deleted in the digest (original digest) by using the difference in step S303.

Whether an audience has seen the original digest can be determined by determining whether the audience data are received after distribution of the original digest. In addition, information indicating whether the audience lives in an area where the original digest is to be distributed can be used for determining whether the audience has seen the original digest.

Figure 25:
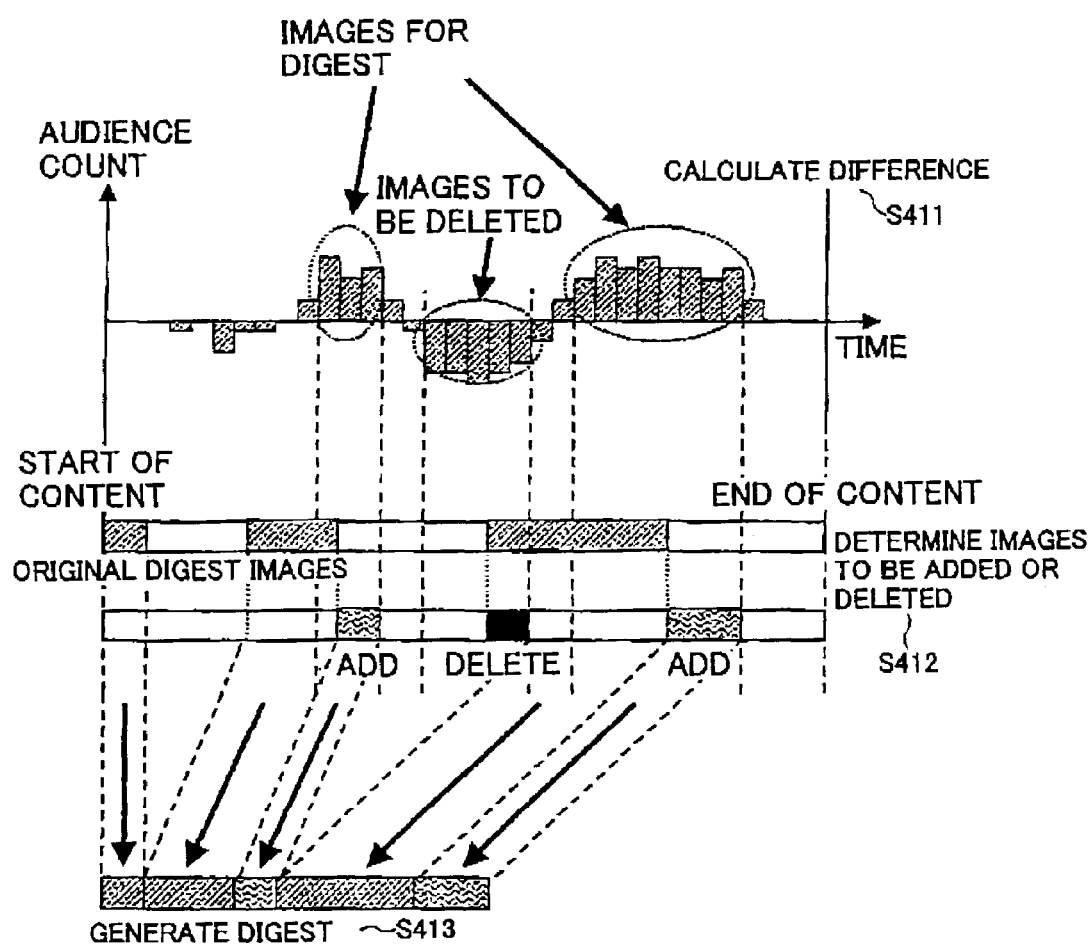
FIG. 25 is a figure for explaining a procedure for generating a digest according to the seventh embodiment of the present invention.

Next, the procedure for generating the digest is further described by referencing to FIG. 25.

The digest generating part 114 compares the histogram (first histogram) of audiences who have watched or listened to the original digest with the histogram (second histogram) of audiences who have not watched or listened to the original digest. More precisely, for each time position, an audience count (first audience count) at a time position in the first histogram is compared with an audience count (second audience count) at the same time position in the second histogram.

Then, the digest generating part 114 subtracts the second audience count from the first audience count for each time position, so as to obtain differences in step S411 (audience count difference in FIG. 25).

Then, images having a positively large difference are added in the original digest, and images having a negatively large difference are deleted from the original digest in step S412, so that the original digest is edited and a new digest is generated in step S413. That is, if a part of images having the positively large difference is included in the original digest, this part is not changed. A part that is not included in the original digest is added. In addition, if a part of the images having the negatively large difference is not included in the original digest, this part is not changed, whereas a part included in the original digest is deleted. Whether images having a difference are added or deleted can be determined by using a threshold, for example.

As mentioned above, information that indicates whether an audience has seen the original digest is used. Accordingly, when interests of audiences are shifted over time, a new histogram can be generated according to interests of audiences who have seen the original digest, so that the shift from initial interests can be reflected and a new effective digest can be generated.

In addition, instead of using the difference obtained by using the information whether the original digest is watched or listened to, a difference between histograms that are made at different times can be used. Accordingly, a digest can be generated considering time elapsing.

Figure 26:
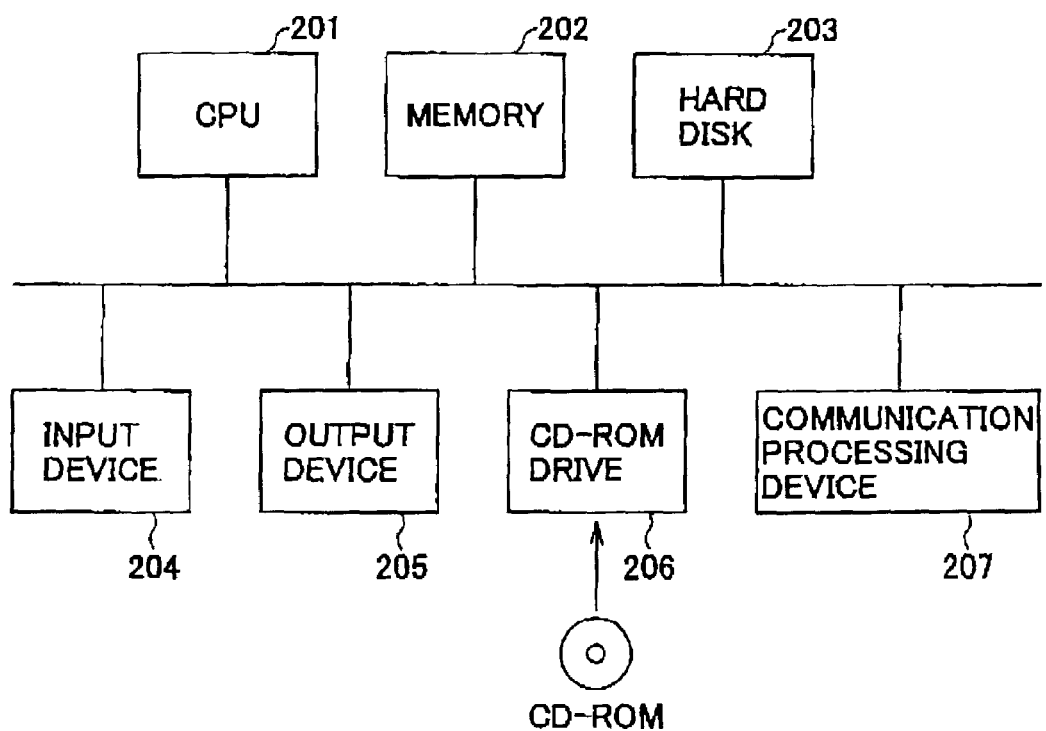
FIG. 26 is a block diagram of a computer that can be used as a digest image generating apparatus.

A part or whole function of the digest image generating apparatus of each embodiment can be realized by a computer program. By executing the program on a computer shown in FIG. 26, each embodiment can be realized. The computer shown in FIG. 26 includes a CPU 201, a memory 202, a hard disk 203, an input device 204, an output device 205, a CD-ROM drive 206, and a communication processing apparatus 207.

The program can be recorded in a computer readable recording medium, such as, floppy disk (FD), MO, ROM, memory card, CD-ROM, DVD, and removable disk. The recording medium can be held or distributed. In addition, the program can be provided via a network by using the Internet, e-mail and the like.

As mentioned above, according to the fourth to seventh embodiments, a digest on which the user profile is reflected can be generated. Therefore, a digest can be generated on the basis of a specific user profile. For example, by specifying an area that is one of the user profiles, a digest effectively reflecting images specific for the area can be generated, such as images of a sports team of the area, images of a popular shop in the area and the like.

In addition, by specifying age bracket or gender, a digest can be generated and distributed for audiences targeted for selling the content. In addition, a request, by a content-distributing firm, a producer or an agency of actors, for including a specific scene in a digest can be addressed with flexibility. In addition, by releasing the excluding filter step by step, scenes in a digest are increased gradually. Therefore, a digest can be generated including an effective scene for audiences who are not interested in an initial digest.

In addition, after once sending a digest, a digest can be regenerated in consideration of whether audiences have watched or listened to the original digest.

The present invention is not limited to the specifically disclosed embodiments, and variations and modifications may be made without departing from the scope of the present invention.

What is claimed is:

1. A method for a digest generating apparatus to generate a new digest of image content or sound content based on a digest generated before, said method comprising the steps of:
   obtaining audience data of audiences of image content or sound content that is a target for generating said new digest, and obtaining information indicating whether said audiences have watched or have listened to said digest generated before;
   obtaining, based on said audience data and said information, differences between first audience ratings or first audience counts for said image content or said sound content, and, second audience ratings or second audience counts for said image content or said sound content, wherein said first audience ratings or said first audience counts are data corresponding to audiences who have watched or listened to said digest generated before, and said second audience ratings or said second audience counts are data corresponding to audiences who have not watched or listened to said digest generated before; and
   adding first specific images or sounds in said image content or said sound content to said digest generated before, wherein said first specific images or sounds fall within a time interval where said differences exceed a predetermined threshold, and deleting second specific images or sounds in said image content or said sound content from said digest generated before, wherein said second specific images or sounds fall within a time interval where said differences are less than a predetermined threshold, so as to generate said new digest.

2. The method as claimed in claim 1, said method comprising the steps of:
   receiving designation of a specific genre; and
   generating said digest of image content or sound content that belongs to said specific genre.

3. The method as claimed in claim 1, wherein said first audience rating or said first audience count and said second audience rating or second audience count are obtained by using audience data corresponding to an audience group having a specific user profile at established time intervals.

4. The method as claimed in claim 1, said method comprising the step of:
   excluding predetermined images or sounds in said image content or said sound content from candidate images or sounds to be included in said digest, or, including predetermined images or sounds in said digest.

5. The method as claimed in claim 4, wherein said predetermined images or sounds can be changed over time.

6. A digest generating apparatus used for generating a new digest of image content or sound content based on a digest generated before, said digest generating apparatus comprising:
   a first obtaining part for obtaining audience data of audiences of image content or sound content that is a target for generating said new digest, and obtaining information indicating whether said audiences have watched or have listened to said digest generated before;
   a second obtaining part for obtaining, based on said audience data and said information, differences between first audience ratings or first audience counts for said image content or said sound content, and, second audience ratings or second audience counts for said image content or said sound content, wherein said first audience ratings or said first audience counts are data corresponding to audiences who have watched or listened to said digest generated before, and said second audience ratings or said second audience counts are data corresponding to audiences who have not watched or listened to said digest generated before; and
   an adding part for adding first specific images or sounds in said image content or said sound content to said digest generated before, wherein said first specific images or sounds fall within a time interval where said differences exceed a predetermined threshold, and deleting second specific images or sounds in said image content or said sound content from said digest generated before, wherein said second specific images or sounds fall within a time interval where said differences are less than a predetermined threshold, so as to generate said new digest.

7. The digest generating apparatus as claimed in claim 6, said digest generating apparatus comprising:
   a part for receiving designation of a specific genre; and
   a part for generating said digest of image content or sound content that belongs to said specific genre.

8. The digest generating apparatus as claimed in claim 6, wherein said first audience rating or said first audience count and second audience rating or said second audience count are obtained by using audience data corresponding to an audience group having a specific user profile at established time intervals.

9. The digest generating apparatus as claimed in claim 6, said digest generating apparatus comprising:
   a part for excluding predetermined images or sounds in said image content or said sound content from candidate images or sounds to be included in said digest, or, including predetermined images or sounds in said digest.

10. The digest generating apparatus as claimed in claim 9, wherein said predetermined images or sounds can be changed over time.

11. A computer program for causing a computer to generate a new digest of image content or sound content based on a digest generated before, said computer program comprising:
- first obtaining code means for obtaining audience data of audiences of image content or sound content that is a target for generating said new digest, and obtaining information indicating whether said audiences have watched or have listened to said digest generated before;
- second obtaining code means for obtaining, based on said audience data and said information, differences between first audience ratings or first audience counts for said image content or said sound content, and, second audience ratings or second audience counts for said image content or said sound content, wherein said first audience ratings or said first audience counts are data corresponding to audiences who have watched or listened to said digest generated before, and said second audience ratings or said second audience counts are data corresponding to audiences who have not watched or listened to said digest generated before; and
- adding code means for adding first specific images or sounds in said image content or said sound content to said digest generated before, wherein said first specific images or sounds fall within a time interval where said differences exceed a predetermined threshold, and deleting second specific images or sounds in said image content or said sound content from said digest generated before, wherein said second specific images or sounds fall within a time interval where said differences are less than a predetermined threshold, so as to generate said new digest.

12. The computer program as claimed in claim 11, said computer program comprising:
- program code means for receiving designation of a specific genre; and
- program code means for generating said digest of image content or sound content that belongs to said specific genre.

13. The computer program as claimed in claim 11, wherein said first audience rating or said first audience count and said second audience rating or said second audience count are obtained by using audience data corresponding to an audience group having a specific user profile at established time interval.

14. The computer program as claimed in claim 11, said computer program comprising:
- program code means for excluding predetermined images or sounds in said image content or said sound content from candidate images or sounds to be included in said digest, or, including predetermined images or sounds in said digest.

15. The computer program as claimed in claim 14, wherein said predetermined images or sounds can be changed over time.

16. A computer readable medium storing program code for causing a computer to generate a new digest of image content or sound content based on a digest generated before, said computer readable medium comprising:
- first obtaining code means for obtaining audience data of audiences of image content or sound content that is a target for generating said new digest, and obtaining information indicating whether said audiences have watched or have listened to said digest generated before;
- second obtaining code means for obtaining, based on said audience data and said information, differences between first audience ratings or first audience counts for said image content or said sound content, and, second audience ratings or second audience counts for said image content or said sound content, wherein said first audience ratings or said first audience counts are data corresponding to audiences who have watched or listened to said digest generated before, and said second audience ratings or said second audience counts are data corresponding to audiences who have not watched or listened to said digest generated before; and
- adding code means for adding first specific images or sounds in said image content or said sound content to said digest generated before, wherein said first specific images or sounds fall within a time interval where said differences exceed a predetermined threshold, and deleting second specific images or sounds in said image content or said sound content from said digest generated before, wherein said second specific images or sounds fall within a time interval where said differences are less than a predetermined threshold, so as to generate said new digest.

17. The computer readable medium as claimed in claim 16, said computer readable medium comprising:
- program code means for receiving designation of a specific genre; and
- program code means for generating said digest of image content or sound content that belongs to said specific genre.

18. The computer readable medium as claimed in claim 16, wherein said first audience rating or said first audience count and said second audience rating or said second audience count and obtained by using audience data corresponding to an audience group having a specific user profile at established time intervals.

19. The computer readable medium as claimed in claim 16, said computer readable medium comprising:
- program code means for excluding predetermined images or sounds in said image content or said sound content from candidate images or sounds to be included in said digest, or, including predetermined images or sounds in said digest.

20. The computer readable medium as claimed in claim 19, wherein said predetermined images or sounds can be changed over time.

* * * * *